United States Patent
Oberoi et al.

(10) Patent No.: US 6,747,663 B2
(45) Date of Patent: Jun. 8, 2004

(54) INTERPOLATING SAMPLE VALUES FROM KNOWN TRIANGLE VERTEX VALUES

(75) Inventors: Ranjit S. Oberoi, Saratoga, CA (US); Michael F. Deering, Los Altos, CA (US); Salvatore Arcuri, Dublin, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 474 days.

(21) Appl. No.: 09/939,296

(22) Filed: Aug. 24, 2001

(65) Prior Publication Data

US 2002/0050979 A1 May 2, 2002

Related U.S. Application Data

(60) Provisional application No. 60/227,716, filed on Aug. 24, 2000.

(51) Int. Cl.$^7$ .................................................. G09G 5/00
(52) U.S. Cl. ........................................ 345/606; 345/581
(58) Field of Search ................................ 345/606, 607, 345/418, 611, 614, 581, 582, 609

(56) References Cited

U.S. PATENT DOCUMENTS 5,801,711 A    9/1998  Koss et al.
6,535,220 B2 * 3/2003  Deering et al. ............. 345/582
6,618,054 B2 * 9/2003  Deering ....................... 345/581

FOREIGN PATENT DOCUMENTS

GB             2 278 524 A       11/1994

* cited by examiner

Primary Examiner—Matthew Luu
(74) Attorney, Agent, or Firm—Meyertons Hood Kivlin Kowert & Goetzel, P.C.; Jeffrey C. Hood; Mark K. Brightwell

(57) ABSTRACT

A graphics system comprises a rendering unit, a sample buffer and a sample-to-pixel calculation unit. The rendering unit receives graphics data specifying three triangle vertices, generates sample positions, and determines which samples reside inside the triangle. The rendering unit computes an axial rate of change of an ordinate based on the positions and ordinates of the vertices, and, for each sample residing inside the triangle, (a) multiplies the axial rate by a edge-relative sample displacement resulting in a first product, (b) interpolates a projection value for a projection point on a first edge of the triangle, and (c) adds the first product to the projection value resulting in a sample ordinate value. The sample buffer stores the sample ordinate value the samples inside the triangle. The sample-to-pixel calculation unit reads sample ordinate values from the sample buffer and generates a pixel value by filtering the sample ordinate values.

41 Claims, 28 Drawing Sheets

| $W_{23}\backslash W_{13}$ | 1  | 0 | 4 | 5  | 7  | 6 | 2 | 3  |
|---|---|---|---|---|---|---|---|---|
| 1 | <= | 0 | 0 | 0  | <= | 1 | 1 | 1  |
| 0 | 1  | > | 0 | 0  | 0  | > | 1 | 1  |
| 4 | 1  | 1 | > | 0  | 0  | 0 | > | 1  |
| 5 | 1  | 1 | 1 | <= | 0  | 0 | 0 | <= |
| 7 | <= | 1 | 1 | 1  | <= | 0 | 0 | 0  |
| 6 | 0  | > | 1 | 1  | 1  | > | 0 | 0  |
| 2 | 0  | 0 | > | 1  | 1  | 1 | > | 0  |
| 3 | 0  | 0 | 0 | <= | 1  | 1 | 1 | <= |

INTERPOLATING SAMPLE VALUES FROM KNOWN TRIANGLE VERTEX VALUES

CROSS-REFERENCE TO RELATED APPLICATIONS

This application claims the benefit of U.S. Provisional Application No. 60/227,716 filed on Aug. 24, 2000 now abandoned entitled "Interpolating Sample Values from Known Triangle Vertex Values".

BACKGROUND OF THE INVENTION

1. Field of the Invention

This invention relates generally to the field of digital signal processing and, more particularly, to a system and method for interpolating sample values based on known values at the vertices of a triangle.

2. Description of the Related Art

Prior art graphics systems have typically partitioned objects into a stream of triangles. Each triangle may comprise three vertices with assigned color values. To generate color values for pixels residing inside a triangle, an interpolation may be performed based on the position of each pixel with respect to the triangle vertices. Many prior art techniques for this interpolation have operated under the assumption that the pixel positions lie on a rectangular grid. If the pixels do not lie on a rectangular grid, such prior art techniques may not be as useful or may operate with degraded efficiency. Therefore, a graphics system and method are desired which may provide interpolation of ordinate values (e.g. color values) for pixels (and/or samples) which do not necessarily lie on a rectangular grid.

SUMMARY OF THE INVENTION

A graphics system may, in one embodiment, comprise a rendering unit, a sample buffer, and a sample-to-pixel calculation unit. The rendering unit may comprise one or more processors (e.g. DSP chips), dedicated hardware, or any combination thereof. The rendering unit may be configured to receive graphics data including three vertices defining a triangle. The rendering unit may generate sample positions in a two-dimensional screen space, and may determine which of the samples resides inside the triangle. The samples positions may be generated according to a perturbed regular sample-positioning scheme, a pseudo-random perturbed regular sample-positioning scheme, etc.

In some embodiments, the rendering unit may be configured to compute a first axial rate of change of a first ordinate based on the three vertices, and, for each sample residing inside the triangle, (a) to multiply the first axial rate by an edge-relative sample displacement resulting in a first product, (b) to interpolate a first projection value for a projection point on a first edge of the triangle, and (c) to add the first product to the first projection value resulting in the sample ordinate value. The projection point on the first edge may have the same major axis coordinate as the sample point. The first edge may be the edge of the triangle which has the largest major axis displacement.

The sample buffer may be configured to store the first sample ordinate value for each of the samples inside the triangle. The sample-to-pixel calculation unit may be configured to read one or more of the first sample ordinate values from the sample buffer, to generate a pixel value by filtering (e.g. convolving) the one or more first sample ordinate values, and to supply the pixel value to a display device.

The rendering unit may compute the first axial rate by (1) determining a change in the first ordinate between an opposing vertex not on the first edge and an auxiliary point on the first edge having an identical first axis coordinate as the opposing vertex, (2) determining a coordinate change along a second axis between the opposing vertex and the auxiliary point, and (3) multiplying the first ordinate change by the reciprocal of the second axis coordinate change.

The first ordinate change of (1) above may be determined by interpolating an auxiliary ordinate value for the auxiliary point based on a first vertex and a second vertex terminating the first edge and, and subtracting the auxiliary ordinate value from an opposing ordinate value of the opposing vertex.

The rendering unit may interpolate the first projection value for the projection point by (i) computing a first difference between a first coordinate of the projection point and a first coordinate of a first vertex of the first edge, (ii) multiplying the first difference by a first scaling factor resulting in a second difference, and (iii) adding the second difference to a root ordinate value corresponding to the first vertex. The first scaling factor may be computed by determining an ordinate change between a second vertex of the first edge and the first vertex, determining a second difference between a first coordinate of the second vertex and the first coordinate of the first vertex, and multiplying the ordinate change by the reciprocal of the second difference.

The rendering unit may be configured to determine if each sample resides inside the triangle by computing edge-relative displacements between the sample and the three edges of the triangle. Thus, the first sample displacement mentioned above may be the edge-relative displacement for the first edge.

In one set of embodiments, the rendering unit may be configured to compute a first minor axis ordinate difference along a minor axis of the triangle. The rendering unit may compute a sample ordinate value for each sample inside the triangle by:

(a) computing a minor axis positional fraction corresponding to the first sample;

(b) multiplying the minor axis positional fraction by the first minor axis ordinate difference to generate a first product; and (c) adding the first product to one or more ordinate adjustment values to generate the first sample ordinate value.

The rendering unit may compute the first minor axis ordinate difference by interpolating an auxiliary ordinate value for an auxiliary point on a first edge of the triangle, and subtracting the auxiliary ordinate value from an ordinate value of an opposing vertex not on the first edge. The auxiliary point may have the same major axis coordinate as the opposing vertex.

The minor axis positional fraction corresponding to the first sample may be computed by subtracting a minor axis coordinate of the auxiliary point from the minor axis coordinate of the opposing vertex to generate a minor axis positional difference; and multiplying a first minor axis sample displacement corresponding to the first sample by a reciprocal of the minor axis positional difference to generate the minor axis positional fraction. The first minor axis sample displacement may equal a minor axis coordinate of said first sample minus a minor axis coordinate of a projection point on the first edge.

The rendering unit may be further configured to compute a first edge ordinate difference for a first edge of the triangle, and to compute the first sample ordinate value for the first sample inside the triangle by: (d) computing a major axis positional fraction corresponding to the first sample; and (e) multiplying the major axis positional fraction by the first edge ordinate difference to generate a first one of said one or more ordinate adjustment values. The ordinate value of a first vertex bounding the first edge may be a second one of said one or more ordinate adjustment values.

The first edge ordinate difference may be computed by subtracting an ordinate value for the first vertex from an ordinate value of a second vertex bounding the first edge. Furthermore, the major axis positional fraction corresponding to the first sample may be computed by: subtracting a major axis coordinate of the first vertex from a major axis coordinate of a second vertex bounding the first edge to generate a first edge major displacement; subtracting a major axis coordinate of the first vertex from a major axis coordinate of the first sample to generate a sample-relative major axis displacement; and multiplying the sample-relative major axis displacement by the reciprocal of the first edge major displacement.

As used herein the term "ordinate" refers to any attribute value such as red, green, blue or alpha which is to be determined at sample (or pixel) positions internal to a polygon based on the corresponding attributes values assigned to the polygon vertices.

BRIEF DESCRIPTION OF THE DRAWINGS

The foregoing, as well as other objects, features, and advantages of this invention may be more completely understood by reference to the following detailed description when read together with the accompanying drawings in which:

FIG. 14D illustrates one embodiment of a method for determining triangle orientation based on a coded representation of edge displacements along two edges of the triangle;

Figure 1:
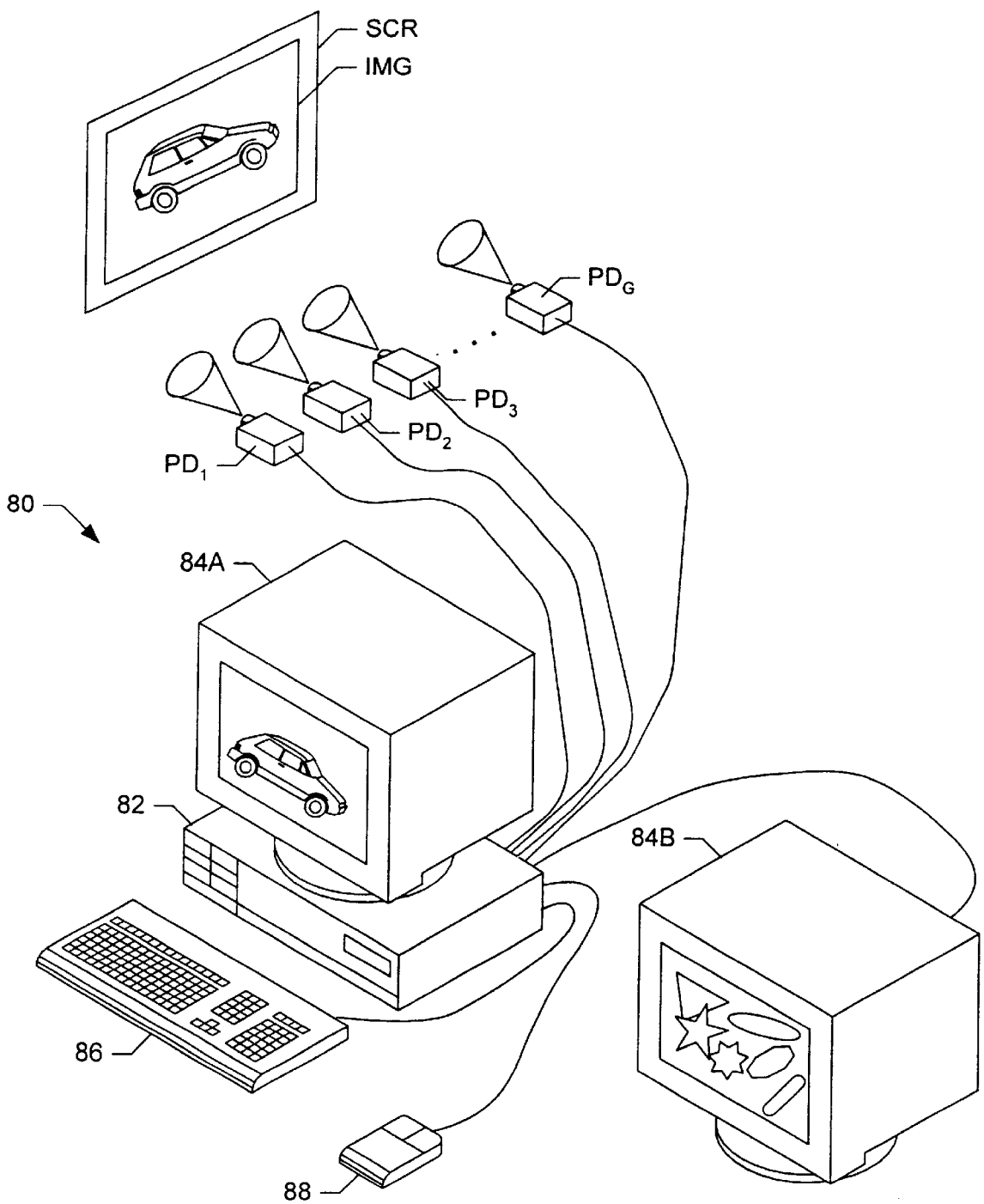
FIG. 1 illustrates a computer system which includes a graphics system 112 for driving one or more display devices (including monitor devices and/or projection devices)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the headings are for organizational purposes only and are not meant to limit the description or claims.

DETAILED DESCRIPTION OF SEVERAL EMBODIMENTS

FIG. 1—Computer System

FIG. 1 illustrates one embodiment of a computer system 80, which performs three-dimensional (3-D) graphics. Computer system 80 comprises a system unit 82 which may couple to one or more display devices such as monitor devices 84A and 84B and/or projection devices $PD_1$ through $PD_G$. Monitor devices 84A and 84B may be based on any of a variety of display technologies. For example, monitor devices 84A and 84B may be CRT displays, LCD displays, gas-plasma displays, digital micro-mirror displays, liquid crystal on silicon (LCOS) display, etc., or any combination thereof. Similarly, projection devices $PD_1$ through $PD_G$ may be realized by any of a variety of projection technologies. For example, projection devices $PD_1$ through $PD_G$ may be CRT-based projectors, LCD projectors, LightValve projectors, gas-plasma projectors, digital micromirror (DMM) projectors, LCOS projectors, etc., or any combination thereof. Monitor devices 84A and 84B are meant to represent an arbitrary number of monitor devices.

Various input devices may be connected to system unit 82, including a keyboard 86, a mouse 88, a video camera, a trackball, a digitizing tablet, a six-degree of freedom input device, a head tracker, an eye tracker, a data glove, body sensors, a touch-sensitive screen, etc. Application software may be executed by computer system 80 to display 3-D graphical objects on projection screen SCR and/or monitor devices 84A and 84B. It is noted that projection devices $PD_1$ through $PD_G$ may project their respective component images onto a surface other than a conventional projection screen, and/or onto surfaces that are curved (e.g. the retina of a human eye).

Figure 2:
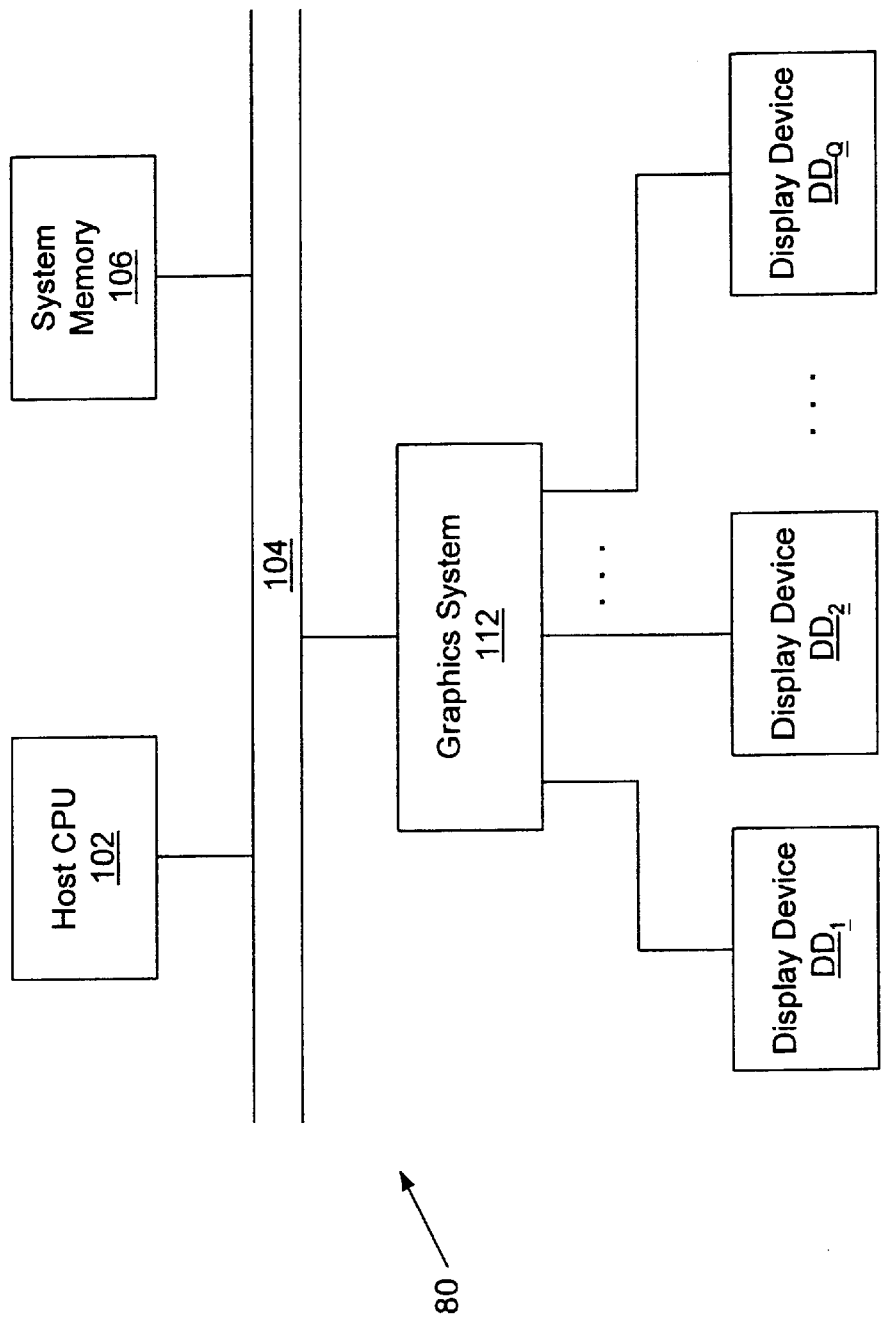
FIG. 2 is a simplified block diagram of the computer system of FIG. 1.

FIG. 2—Computer System Block Diagram

FIG. 2 presents a simplified block diagram for computer system 80. Computer system 80 comprises a host central processing unit (CPU) 102 and a 3-D graphics system 112 coupled to system bus 104. A system memory 106 may also be coupled to system bus 104. Other memory media devices such as disk drives, CD-ROM drives, tape drives, etc. may be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM) and/or random access memory (RAM)—such as static random access memory (SRAM), synchronous dynamic random access memory (SDRAM) and/or Rambus dynamic access memory (RDRAM).

System bus 104 may comprise one or more communication buses or host computer buses (e.g., for communication between host processors and memory subsystems). In addition, various peripheral devices and peripheral buses may be connected to system bus 104.

Figure 3A:
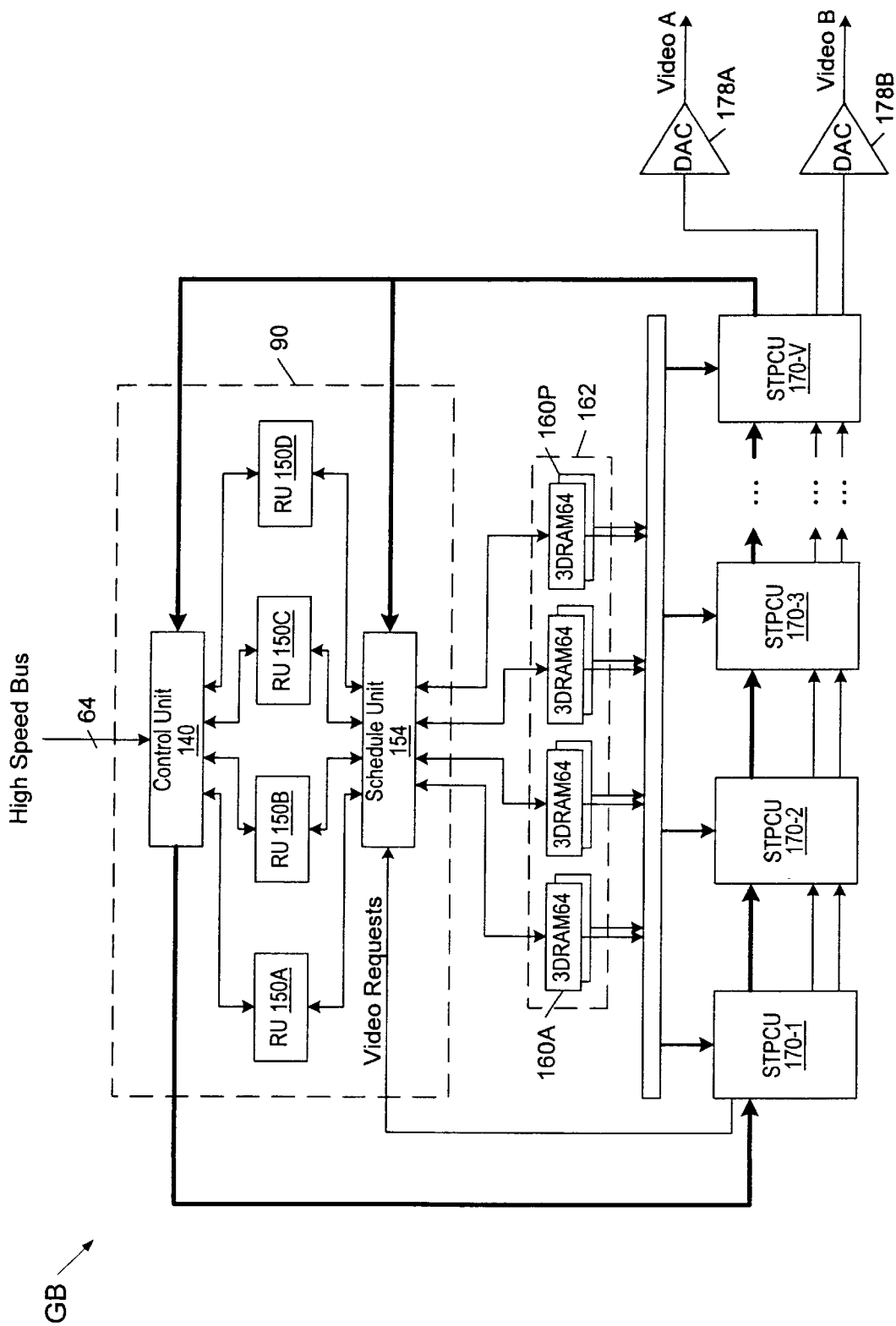
FIG. 3A is a block diagram illustrating one embodiment of a graphics board GB.

Graphics system 112 may comprise one or more graphics boards. The graphics boards may couple to system bus 104 by any of a variety of connectivity technologies (e.g. crossbar switches). The graphics boards may generate video signals for display devices $DD_1$ through $DD_Q$ in response to graphics commands and data received from one or more graphics applications executing on host CPU 102. Display devices $DD_1$ through $DD_Q$ may include monitor devices 84A and 84B, and projection device $PD_1$ through $PD_G$. FIG. 3A illustrates one embodiment of a graphics board GB for enhancing 3D-graphics performance.

Graphics board GB may couple to one or more busses of various types in addition to system bus 104. Furthermore, graphics board GB may couple to a communication port, and thereby, directly receive graphics data from an external source such as the Internet or a local area network.

Host CPU 102 may transfer information to/from graphics board GB according to a programmed input/output (I/O) protocol over system bus 104. Alternately, graphics board GB may access system memory 106 according to a direct memory access (DMA) protocol or through intelligent bus mastering.

A graphics application, e.g. an application conforming to an application programming interface (API) such as OpenGL® or Java® 3D, may execute on host CPU 102 and generate commands and data that define geometric primitives such as polygons for output on display devices $DD_1$ through $DD_Q$. Host CPU 102 may transfer this graphics data to system memory 106. Thereafter, the host CPU 102 may transfer the graphics data to graphics board GB over system bus 104. In another embodiment, graphics board GB may read geometry data arrays from system memory 106 using DMA access cycles. In yet another embodiment, graphics board GB may be coupled to system memory 106 through a direct port, such as an Advanced Graphics Port (AGP) promulgated by Intel Corporation.

Graphics board GB may receive graphics data from any of various sources including host CPU 102, system memory 106 or any other memory, external sources such as a network (e.g., the Internet) or a broadcast medium (e.g. television). While graphics board GB is described above as a part of computer system 80, graphics board GB may also be configured as a stand-alone device.

Graphics board GB may be comprised in any of various systems including a network PC, an Internet appliance, a game console, a virtual reality system, a CAD/CAM station, a simulator (e.g. an aircraft flight simulator), a television (e.g. an HDTV system or an interactive television system), or other devices which display 2D and/or 3D graphics.

As shown in FIG. 3A, graphics board GB may comprise a graphics processing unit (GPU) 90, a super-sampled sample buffer 162, and one or more sample-to-pixel calculation units 170-1 through 170-V. Graphics board GB may also comprise one or more digital-to-analog converters (DACs) 178A–B.

Graphics processing unit 90 may comprise any combination of processing technologies. For example, graphics processing unit 90 may comprise specialized graphics processors or calculation units, multimedia processors, DSPs, general-purpose processors, reconfigurable logic (e.g. programmable gate arrays), dedicated ASIC chips, etc.

In one embodiment, graphics processing unit 90 may comprise one or more rendering units 150A–D. Graphics processing unit 90 may also comprise one or more control units 140, and one or more schedule units 154. Sample buffer 162 may comprise one or more sample memories 160A–160P.

A. Control Unit 140

Control unit 140 operates as the interface between graphics board GB and CPU 102, i.e. controls the transfer of data between graphics board GB and CPU 102. In embodiments where rendering units 150A–D comprise two or more rendering units, control unit 140 may also divide a stream of graphics data received from CPU 102 and/or system memory 106 into a corresponding number of parallel streams that are routed to the individual rendering units.

The graphics data stream may be received from CPU 102 and/or system memory 106 in a compressed form. Graphics data compression may advantageously reduce the required transfer bandwidth for the graphics data stream. In one embodiment, control unit 140 may be configured to split and route the received data stream to rendering units 150A–D in compressed form.

The graphics data may comprise graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996.

It is noted that the embodiments and examples presented herein are described in terms of polygons (e.g. triangles) for the sake of simplicity. However, any type of graphics primitive may be used instead of or in addition to polygons in these embodiments and examples.

B. Rendering Units 150A–D

Each of rendering units 150A–D (also referred to herein as draw units) may receive a stream of graphics data from control unit 140, and perform a number of functions in response to the graphics stream. For example, each of rendering units 150A–D may be configured to perform decompression (if the received graphics data is presented in compressed form), transformation, clipping, lighting, texturing, depth cueing, transparency processing, setup, and virtual screen-space rendering of graphics primitives occurring within the graphics stream. Each of rendering units 150A–D may comprise one or more processors (e.g. specialized graphics processors, digital signal processors, general purpose processors, etc.) and/or specialized circuitry (e.g. ASIC chips).

Figure 3B:
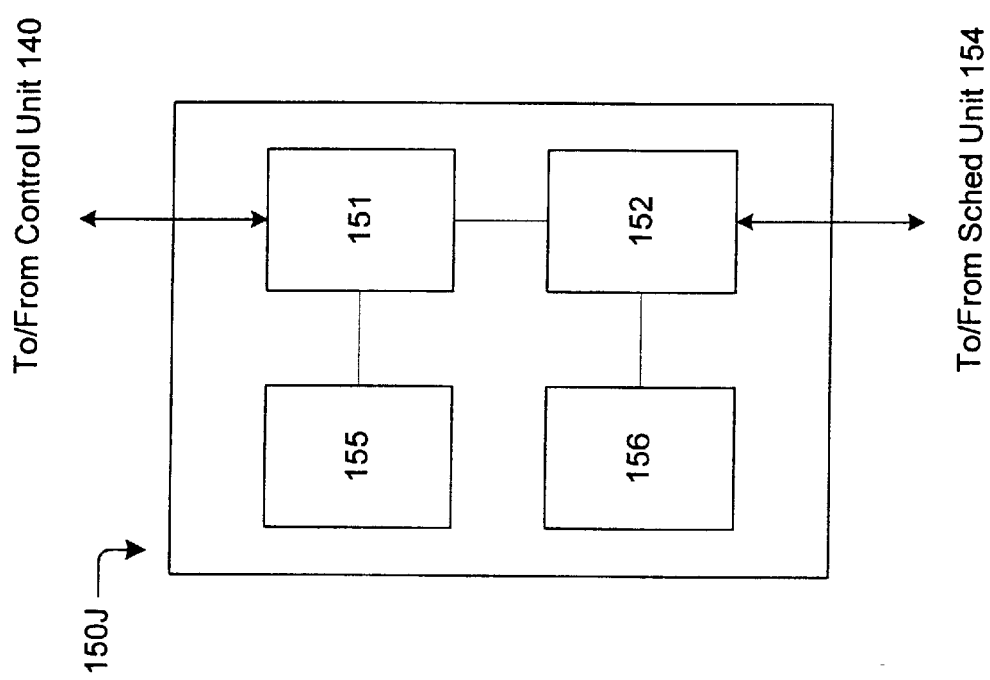
FIG. 3B is a block diagram illustrating one embodiment of a rendering unit comprised within graphics system 112.

In one embodiment, each of rendering units 150A–D may be configured in accord with rendering unit 150J illustrated in FIG. 3B. Rendering unit 150J may comprise a first rendering unit 151 and second rendering unit 152. First rendering unit 151 may be configured to perform decompression (for compressed graphics data), format conversion, transformation, lighting, etc. Second rendering unit 152 may be configured to perform setup computations, virtual screen space rasterization, sample rendering, etc. First rendering unit 151 may be coupled to first data memory 155, and second rendering unit 152 may be coupled to second data memory 156. First data memory 155 may comprise RDRAM, and second data memory 156 may comprise SDRAM. First rendering unit 151 may comprise one or more processors such as media processors. Second rendering unit 152 may comprise a dedicated ASIC chip.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). Rendering units 150A–D may also be configured to decode graphics data that has been compressed using geometric compression. Geometric compression of 3D graphics data may achieve significant reductions in data size while retaining most of the image quality. A number of methods for compressing and decompressing 3D geometry are described in:

U.S. Pat. No. 5,793,371, Application Ser. No. 08/511,294, filed on Aug. 4, 1995, entitled "Method And Apparatus For Geometric Compression Of Three-Dimensional Graphics Data," Attorney Docket No. 5181-05900; and U.S. patent application Ser. No. 09/095,777, filed on Jun. 11, 1998, entitled "Compression of Three-Dimensional Geometry Data Representing a Regularly Tiled Surface Portion of a Graphical Object," Attorney Docket No. 5181-06602.

In embodiments of graphics board GB that support decompression, the graphics data received by a rendering unit (i.e. any of rendering units 150A–D) may be decompressed into one or more graphics "primitives" which may then be rendered. The term primitive refers to geometric components that define the shape of an object, e.g., points, lines, triangles, polygons, polyhedra, or free-form surfaces in three dimensions.

Rendering units 150A–D may be configured to perform transformation. Transformation refers to applying a geometric operation to a primitive or an object comprising a set of primitives. For example, an object represented by a set of vertices in a local coordinate system may be embedded with arbitrary position, orientation, and size in world space using an appropriate sequence of translation, rotation, and scaling transformations. Transformation may also comprise reflection, skewing, or any other affine transformation. More generally, transformations may comprise non-linear operations.

Rendering units 150A–D may be configured to perform lighting. Lighting refers to calculating the illumination of the objects. Lighting computations result in an assignment of color and/or brightness to objects or to selected points (e.g. vertices) on objects. Depending upon the shading algorithm being used (e.g., constant, Gouraud, or Phong shading), lighting may be evaluated at a number of different locations. For example, if constant shading is used (i.e., the lighted surface of a polygon is assigned a constant illumination value), then the lighting need only be calculated once per polygon. If Gouraud shading is used, then the lighting is calculated once per vertex. Phong shading calculates the lighting on a per-sample basis.

Rendering units 150A–D may be configured to perform clipping. Clipping refers to the elimination of primitives or portions of primitives, which lie outside a clipping region (e.g. a two-dimensional viewport rectangle). For example, the clipping of a triangle to the two-dimensional viewport may result in a polygon (i.e. the polygon which lies interior to the triangle and the rectangle). The resultant polygon may be fragmented into sub-primitives (e.g. triangles). In the preferred embodiment, only primitives (or portions of primitives) which survive the clipping computation are rendered in terms of samples.

Rendering units 150A–D may be configured to perform virtual screen space rendering. Virtual screen space rendering refers to calculations that are performed to generate samples for graphics primitives. For example, the vertices of a triangle in 3-D may be projected onto the 2-D viewport. The projected triangle may be populated with samples, and ordinate values (e.g. red, green, blue, alpha, Z, etc.) may be assigned to the samples based on the corresponding ordinates values already determined for the projected vertices. (For example, the red value for each sample in the projected triangle may be interpolated from the known red values of the vertices.) These sample ordinate values for the projected triangle may be stored in sample buffer 162. A virtual image accumulates in sample buffer 162 as successive primitives are rendered. Thus, the 2-D viewport is said to be a virtual screen on which the virtual image is rendered. The sample ordinate values comprising the virtual image are stored into sample buffer 162. Points in the 2-D viewport are described in terms of virtual screen coordinates X and Y, and are said to reside in virtual screen space.

When the virtual image is complete, e.g., when all graphics primitives have been rendered, sample-to-pixel calculation units 170 may access the samples comprising the virtual image, and may filter the samples to generate pixel ordinate values (e.g. red, green, blue, alpha, etc.). In other words, the sample-to-pixel calculation units 170 may perform a spatial convolution of the virtual image with respect to a convolution kernel C(X,Y) to generate pixel ordinate values. For example, a sample-to-pixel calculation unit may compute a red value $R_p$ for a pixel P at any location $(X_p, Y_p)$ in virtual screen space based on the relation $$R_p = \frac{1}{E}\sum C(X_i - X_p, Y_i - Y_p)R(X_i, Y_i),$$

where the summation is evaluated at sample positions $(X_i, Y_i)$ in a neighborhood of location $(X_p, Y_p)$, and where $R(X_i, Y_i)$ are the red values corresponding to sample positions $(X_i, Y_i)$. Since convolution kernel C(X, Y) may be non-zero only in a neighborhood of the origin, the displaced kernel C(X-$X_p$, Y-$Y_p$) may take non-zero values only in a neighborhood of location $(X_p, Y_p)$. Similar summations to compute other pixel ordinate values (e.g. green, blue, alpha, etc.) in terms of the corresponding sample ordinate values may be performed. In the preferred embodiment, some or all of the pixel ordinate value summations may be performed in parallel.

The value E is a normalization value that may be computed according to the relation $$E = \Sigma C(X_i - X_p, Y_i - Y_p)$$

where the summation is evaluated for the same samples $(X_i, Y_i)$ as in the red pixel value summation above. The summation for the normalization value E may be performed in parallel with the red, green, blue, and/or alpha pixel value summations. The location $(X_p, Y_p)$ may be referred to as a pixel center, or a pixel origin. The pixel ordinate values (e.g. RGB) may be presented to one or more of display devices $DD_1$ through $DD_Q$.

In the embodiment of graphics board GB shown in FIG. 3A, rendering units 150A–D compute sample values instead of pixel values. This allows rendering units 150A–D to perform super-sampling, i.e. to compute more than one sample per pixel. Super-sampling is discussed more thoroughly below. More details on super-sampling are discussed in the following books:

"Principles of Digital Image Synthesis" by Andrew S. Glassner, 1995, Morgan Kaufman Publishing (Volume 1);

"The Renderman Companion" by Steve Upstill, 1990, Addison Wesley Publishing; and "Advanced Renderman: Creating Cgi for Motion Pictures (Computer Graphics and Geometric Modeling)" by Anthony A. Apodaca and Larry Gritz, Morgan Kaufmann Publishers, c1999, ISBN: 1558606181.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units 170.

It is noted that the 2-D viewport and the virtual image, which is rendered with samples into sample buffer 162, may correspond to an area larger than the area which is physically displayed via display devices $DD_1$ through $DD_Q$. For example, the 2-D viewport may include a viewable subwindow. The viewable subwindow may represent displayable graphics information, while the marginal area of the 2-D viewport (outside the viewable subwindow) may allow for various effects such as panning and zooming. In other words, only that portion of the virtual image which lies within the viewable subwindow gets physically displayed. In one embodiment, the viewable subwindow equals the whole of the 2-D viewport. In this case, all of the virtual image gets physically displayed.

C. Data Memories

In some embodiments, each of rendering units 150A–D may be configured with two memories similar to rendering unit 150J of FIG. 3B. First memory 155 may store data and instructions for rendering unit 151. Second memory 156 may store data and/or instructions for second rendering unit 152. While implementations may vary, in one embodiment memories 155 and 156 may comprise two 8 MByte SDRAMs providing 16 MBytes of storage for each rendering unit 150A–D. Memories 155 and 156 may also comprise RDRAMs (Rambus DRAMs). In one embodiment, RDRAMs may be used to support the decompression and setup operations of each rendering unit, while SDRAMs may be used to support the draw functions of each rendering unit.

D. Schedule Unit

Schedule unit 154 may be coupled between rendering units 150A–D and sample memories 160A–P. Schedule unit 154 is configured to sequence the completed samples and store them in sample memories 160A–P. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–P, which are configured to store the plurality of samples generated by rendering units 150A–D. As used herein, the term "sample buffer" refers to one or more memories which store samples. As previously noted, samples may be filtered to form each pixel ordinate value. Pixel ordinate values may be provided to one or more of display devices $DD_1$ through $DD_Q$. Sample buffer 162 may be configured to support super-sampling, critical sampling, or sub-sampling with respect to pixel resolution. In other words, the average distance between adjacent samples in the virtual image (stored in sample buffer 162) may be smaller than, equal to, or larger than the average distance between adjacent pixel centers in virtual screen space. Furthermore, because the convolution kernel C(X, Y) may take non-zero functional values over a neighborhood which spans several pixel centers, a single sample may contribute to several pixels.

Sample memories 160A–P may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each of sample memories 160A–P may store up to sixteen samples per pixel.

3DRAM-64 memories are specialized memories configured to support full internal double buffering with single-buffered Z in one chip. The double-buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexor that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer with eight samples per pixel.

Since the 3DRAM-64 memories are internally double-buffered, the input pins for each of the two frame buffers in the double-buffered system are time multiplexed (using multiplexors within the memories). The output pins may be similarly time multiplexed. This allows reduced pin count while still providing the benefits of double buffering. 3DRAM-64 memories further reduce pin count by not having Z output pins. Since Z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a Z comparison, and then writing data back in. Instead, the data may be simply written into the 3DRAM-64 memory, with the memory performing the steps described above internally.

Each of rendering units 150A–D may be configured to generate a plurality of sample positions according to one or more sample positioning schemes. For example, in one embodiment, samples may be positioned on a regular grid. In another embodiment, samples may be positioned based on perturbations (i.e. displacements) from a regular grid. This perturbed-regular grid-positioning scheme may generate random sample positions if the perturbations are random or pseudo-random values. In yet another embodiment, samples may be randomly positioned according to any of a variety of methods for generating random number sequences.

The sample positions (or offsets that are added to regular grid positions to form the sample positions) may be read from a sample position memory (e.g., a RAM/ROM table). Upon receiving a polygon that is to be rendered, a rendering unit may determine which samples fall within the polygon based upon the sample positions. The rendering unit may render the samples that fall within the polygon, i.e. interpolate ordinate values (e.g. color values, alpha, depth, etc.) for the samples based on the corresponding ordinate values already determined for the vertices of the polygon. The rendering unit may then store the rendered samples in sample buffer 162. Note as used herein the terms render and draw are used interchangeably and refer to calculating ordinate values for samples.

F. Sample-to-Pixel Calculation Units

Sample-to-pixel calculation units 170-1 through 170-V (collectively referred to as sample-to-pixel calculation units 170) may be coupled between sample memories 160A–P and DACs 178A–B. Sample-to-pixel calculation units 170 are configured to read selected samples from sample memories 160A–P and then perform a filtering operation (e.g. a convolution) on the samples to generate the output pixel values which are provided to one or more of DACs 178A–B. Sample-to-pixel calculation units 170 may be programmable to perform different filter functions at different times depending upon the type of output desired.

In one embodiment, sample-to-pixel calculation units 170 may implement a super-sample reconstruction band-pass filter to convert the super-sampled sample buffer data (stored in sample memories 160A–P) to pixel values. The support of the band-pass filter may cover a rectangular area in virtual screen space which is $L_p$ pixels high and $W_p$ pixels wide. Thus, the number of samples covered by the band-pass filter is approximately equal to $H_p W_p S$, where S is the number of samples per pixel. A variety of values for $L_p$, $W_p$ and S are contemplated. For example, in one embodiment of the band-pass filter $L_p = W_p = 5$. It is noted that with certain sample positioning schemes (see the discussion attending FIGS. 4, 5A & 5B), the number of samples that fall within the filter support may vary as the filter center (i.e. pixel center) is moved in the virtual screen space.

In other embodiments, sample-to-pixel calculation units 170 may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters. For example, the filtering operations may comprise convolution with a box filter, a tent filter, a cylindrical filter, a cone filter, a Gaussian filter, a Catmull-Rom filter, a Mitchell-Netravali filter, a windowed sinc filter, etc., or any combination thereof. Furthermore, the support of the filters used by sample-to-pixel calculation units 170 may be circular, elliptical, rectangular (e.g. square), triangular, hexagonal, etc.

Sample-to-pixel calculation units 170 may also be configured with one or more of the following features: color look-up using pseudo color tables, direct color, inverse gamma correction, and conversion of pixels to non-linear light space. Other features of sample-to-pixel calculation units 170 may include programmable video timing generators, programmable pixel clock synthesizers, cursor generators, and crossbar functions.

Once the sample-to-pixel calculation units 170 have computed color values for pixels, e.g. pixels in a scan line, the pixels may output to one or more video output channels through DACs 178A–B.

G. Digital-to-Analog Converters

Digital-to-Analog Converters (DACs) 178A–B, collectively referred to as DACs 178, operate as the final output stage of graphics board GB. DACs 178 translate digital pixel data received from sample-to-pixel calculation units 170 into analog video signals. DAC 178A couples to output video channel A, and DAC 178B couples to output video channel B. DAC 178A may receive a first stream of digital pixel data from one or more of sample-to-pixel calculation units 170, and converts the first stream into a first video signal which is asserted onto output video channel A. Similarly, DAC 178B may receive a second stream of digital pixel data from one or more of sample-to-pixel calculation units 170, and converts the second stream into a second video signal which is asserted onto output video channel B.

In the preferred embodiment, sample-to-pixel calculation units 170 provide pixel values to DACs 178 without an intervening frame buffer. However, in one alternate embodiment, sample-to-pixel calculation units 170 output the pixel values to a frame buffer prior to display.

In one embodiment, some or all of DACs 178 may be bypassed or omitted in order to output digital pixel data in lieu of analog video signals. This may be useful where some or all of display devices $DD_1$ through $DD_Q$ are based on a digital technology (e.g., an LCD-type display, an LCOS display, or a digital micro-mirror display).

In the preferred embodiment, multiple graphics boards may be chained together so that they share the effort of generating video data for a display device. Thus, in the preferred embodiment, graphics board GB includes a first interface for receiving one or more digital video streams from any previous graphics board in the chain, and a second interface for transmitting digital video streams to any subsequent graphics board in the chain.

It is noted that various embodiments of graphics board GB are contemplated with varying numbers of rendering units, schedule units, sample-to-pixel calculation units, sample memories, more or less than two DACs, more or less than two video output channels, etc.

Figure 5B:
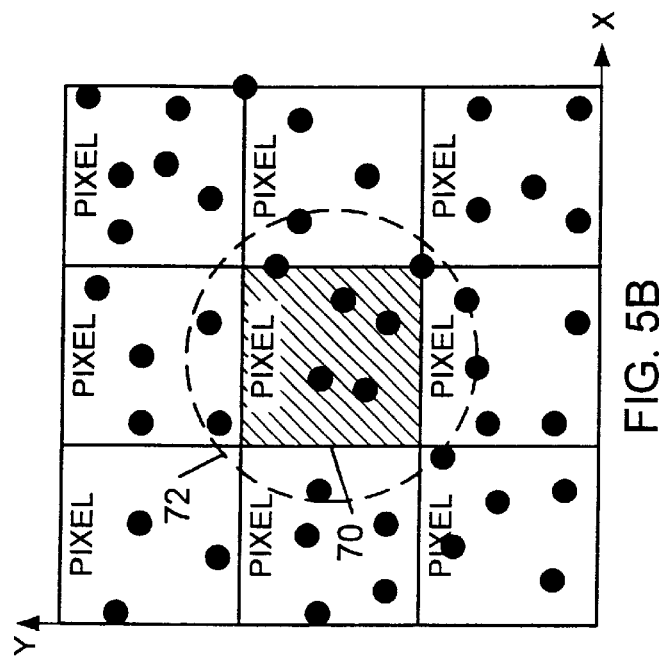
FIG. 5B illustrates one embodiment of a random distribution of samples in a two-dimensional viewport.
Figure 4:
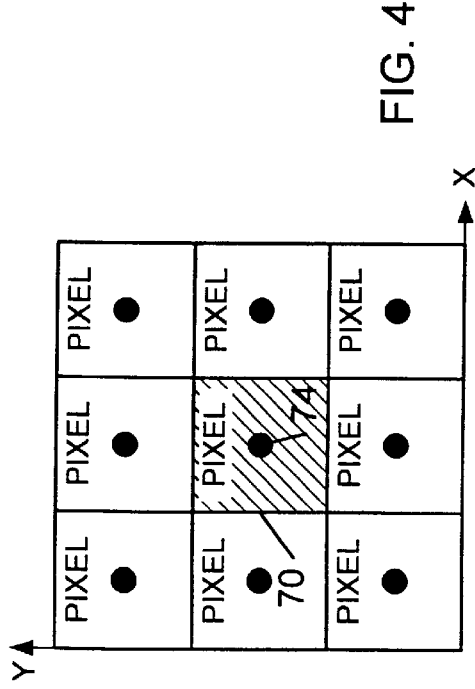
FIG. 4 illustrates one embodiment of a "one sample per pixel" configuration for computation of pixel values.
Figure 5A:
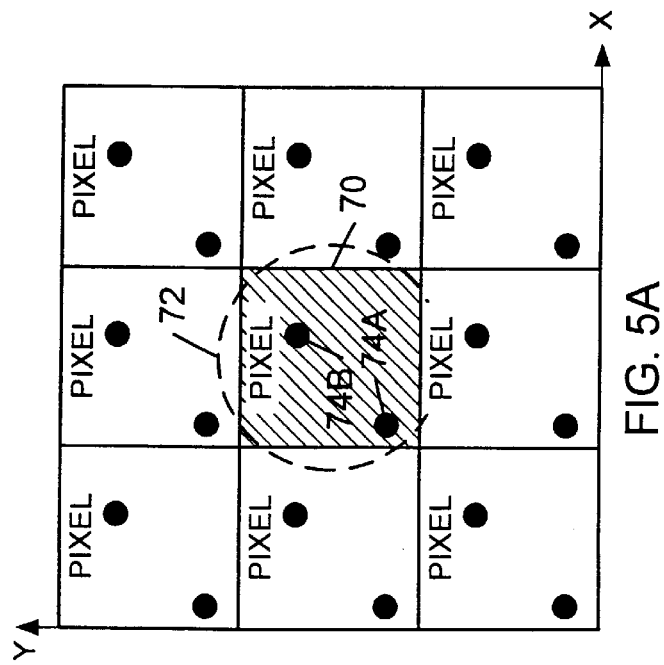
FIG. 5A illustrates one embodiment of super-sampling.

FIGS. 4, 5A, 5B—Super-Sampling

FIG. 4 illustrates a portion of virtual screen space in a non-super-sampled embodiment of graphics board GB. The dots denote sample locations, and the rectangular boxes superimposed on virtual screen space indicate the boundaries between pixels. Rendering units 150A–D may be configured to position one sample in the center of each pixel, and to compute values of red, green, blue, Z, etc. for the samples. For example, sample 74 is assigned to the center of pixel 70. Although rendering units 150A–D may compute values for only one sample per pixel, sample-to-pixel calculation units 170 may compute output pixel values based on multiple samples, e.g. by using a convolution filter whose support spans several pixels.

Turning now to FIG. 5A, an example of one embodiment of super-sampling is illustrated. In this embodiment, rendering units 150A–D compute two samples per pixel. The samples are distributed according to a regular grid. Even though there are more samples than pixels in FIG. 5A, sample-to-pixel calculation units 170 could compute output pixel values using one sample per pixel, e.g. by throwing out all but the sample nearest to the center of each pixel. However, a number of advantages arise from computing pixel values based on multiple samples.

A support region 72 is superimposed over pixel 70, and illustrates the support of a filter which is localized at pixel 70. The support of a filter is the set of locations over which the filter (i.e. the filter kernel) takes non-zero values. In this example, the support region 72 is a circular disc. A sample-to-pixel calculation unit may perform a filtering operation using any of a variety of filters which have region 72 as their support region. Thus, the sample-to-pixel calculation unit may compute the output pixel values (e.g. red, green, blue and Z values) for pixel 70 based only on samples 74A and 74B, because these are the only samples which fall within region 72. This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70. More generally, the filtering operation may generate a weighted sum of the values of samples 74A–B, where the contribution of each sample is weighted according to some function of the sample's position (or distance) with respect to the center of pixel 70. The filter, and thus support region 72, may be repositioned for each output pixel being calculated. In other words, the filter center may visit the center of each output pixel for which pixel values are to be computed. Other filters and filter positioning schemes are also possible and contemplated.

In the example of FIG. 5A, there are two samples per pixel. In general, however, there is no requirement that the number of samples be related to the number of pixels. The number of samples may be completely independent of the number of pixels. For example, the number of samples may be smaller than the number of pixels. (This is the condition that defines sub-sampling).

Turning now to FIG. 5B, another embodiment of super-sampling is illustrated. In this embodiment, the samples are positioned randomly. Thus, the number of samples used to calculate output pixel values may vary from pixel to pixel. Rendering units 150A–D calculate color information at each sample position.

FIGS. 6–13—Super-sampled Sample Buffer with Real-time Convolution

Figure 6:
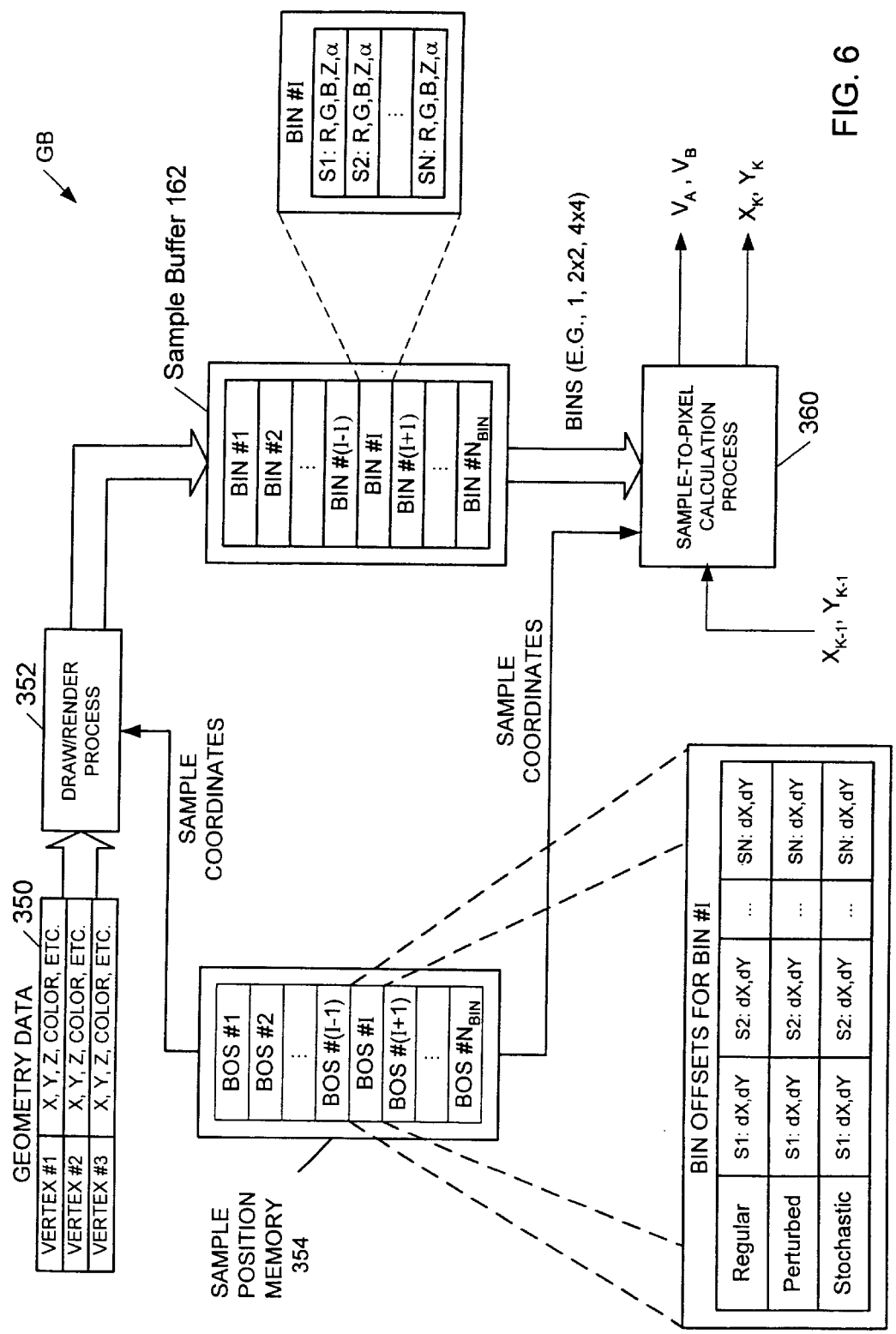
FIG. 6 illustrates one embodiment for the flow of data through graphics board GB.

FIG. 6 illustrates one embodiment for the flow of data through one embodiment of graphics board GB. As the figure shows, geometry data 350 is received by graphics board GB and used to perform draw process 352. The draw process 352 is implemented by graphics processing unit 90, i.e. by one or more of control unit 140, rendering units 150A–D, and schedule unit 154. Geometry data 350 comprises data for one or more polygons. Each polygon comprises a plurality of vertices (e.g., three vertices in the case of a triangle), some of which may be shared among multiple polygons. Data such as x, y, and Z coordinates, color data, lighting data and texture map information may be included for each vertex.

In addition to the vertex data, draw process 352 (which may be performed by each of rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of ordinate values (e.g. red, green, blue, Z, alpha, and/or depth of field information) for each of these samples based on their respective positions within the polygon. For example, the Z value of a sample that falls within a triangle may be interpolated from the known Z values of the three vertices. Each set of computed sample ordinate values may be stored into sample buffer 162.

In one embodiment, sample position memory 354 may be embodied within rendering units 150A–D. In another embodiment, sample position memory 354 may be realized as part of as a separate memory, external to rendering units 150A–D.

Sample position memory 354 may store sample positions in terms of their virtual screen coordinates (X, Y). Alternatively, sample position memory 354 may be configured to store only offsets dX and dY for the samples with respect to positions on a regular grid. Storing only the offsets may use less storage space than storing the entire coordinates (X, Y) for each sample. A dedicated sample position unit (not shown) may read and process the sample position information stored in sample position memory 354 to generate sample positions. More detailed information on the computation of sample positions is included below (see description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process

360. In other words, the unfolding of the random number table may be repeatable. Thus, it may not be necessary to store sample positions at the time of their generation for draw process 352.

As shown in FIG. 6, sample position memory 354 may be configured to generate sample offsets according to a number of different sample-positioning schemes such as a regular grid scheme, a perturbed-regular grid scheme, or a random (i.e. stochastic) positioning scheme. Graphics board GB may receive an indication from the host operating system, device driver, or the geometry data 350 that indicates which type of sample positioning scheme is to be used. Thus, sample position memory 354 is configurable or programmable to generate sample position information according to one or more different schemes. More detailed information on several sample-positioning schemes is provided below. See description of FIG. 8.

In one embodiment, sample position memory 354 may comprise a RAM/ROM that contains stochastically determined sample points or sample offsets. Thus, the density of samples in virtual screen space may not be uniform when observed at small scale. Two bins with equal area centered at different locations in virtual screen space may contain different numbers of samples. As used herein, the term "bin" refers to a region or area in virtual screen space.

An array of bins may be superimposed over virtual screen space, i.e. the 2-D viewport, and the storage of samples in sample buffer 162 may be organized in terms of bins. Sample buffer 162 may comprise an array of memory blocks which correspond to the bins. Each memory block may store the sample ordinate values (e.g. red, green, blue, Z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport ranges from (0000,0000) to (FFFF,FFFF) in hexadecimal virtual screen coordinates. This 2-D viewport may be overlaid with a rectangular array of bins whose lower-left corners reside at the locations (XX00, YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample ordinate values for up to 16 samples, and that the set of sample ordinate values for each sample comprises 4 bytes. In this case, the address of the memory block corresponding to the bin located at (XX00, YY00) may be simply computed by the relation BinAddr=(XX+YY*256)*16*4. For example, the sample S=(1C3B,23A7) resides in the bin located at (1C00, 2300). The set of ordinate values for sample S is then stored in the memory block residing at address 0x8C700=(0x231C)(0x40) in sample buffer 162. The number of bins and numerical ranges given in this example are not meant to be limiting.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the spatial bins in virtual screen space and their corresponding memory blocks may be referred to simply as "bins". The context will determine whether a memory bin or a spatial bin is being referred to.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample-positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. (Other offsets are also possible, e.g., a time offset, a Z-offset, etc.) When added to a bin position, each pair defines a particular position in virtual screen space, i.e. the 2-D viewport. To improve read access times, sample position memory 354 may be constructed in a wide/parallel manner so as to allow the memory to output more than one sample position per read cycle.

Once the sample positions have been read from sample position memory 354, draw process 352 selects the samples that fall within the polygon currently being rendered. Draw process 352 then calculates ordinate values (e.g. color values, Z, alpha, depth of field, etc.) for each of these samples and stores the data into sample buffer 162. In one embodiment, sample buffer 162 may only single-buffer Z values (and perhaps alpha values) while double-buffering other sample ordinates such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of the 2-D viewport may have a smaller bin capacity than bins corresponding to the center of the 2-D viewport. Since viewers are likely to focus their attention mostly on the center of the screen SCR, more processing bandwidth may be dedicated to providing enhanced image quality in the center of 2-D viewport. Note that the size and shape of bins may also vary from region to region, or from frame to frame. The use of bins will be described in greater detail below in connection with FIG. 11.

In parallel with draw process 352, filter process 360 is configured to: (a) read sample positions from sample position memory 354, (b) read corresponding sample values from sample buffer 162, (c) filter the sample values, and (d) output the resulting output pixel values onto video channels A and/or B. Sample-to-pixel calculation units 170 implement filter process 360. Filter process 360 is operable to generate the red, green, and blue values for an output pixel based on a spatial filtering of the corresponding data for a selected plurality of samples, e.g. samples falling in a neighborhood of the pixel center. Other values such as alpha may also be generated. In one embodiment, filter process 360 is configured to: (i) determine the distance of each sample from the pixel center; (ii) multiply each sample's ordinate values (e.g., red, green, blue, alpha) by a filter weight that is a specific (programmable) function of the sample's distance; (iii) generate sums of the weighted ordinates values, one sum per ordinate (e.g. a sum for red, a sum for green, ... ), and (iv) normalize the sums to generate the corresponding pixel ordinate values. Filter process 360 is described in greater detail below (see description accompanying FIGS. 11, 12A, and 15).

In the embodiment just described, the filter kernel is a function of distance from the pixel center. However, in alternative embodiments, the filter kernel may be a more general function of X and Y displacements from the pixel center. Also, the support of the filter, i.e. the 2-D neighborhood over which the filter kernel takes non-zero values, may not be a circular disk. Any sample falling within the support of the filter kernel may affect the output pixel value being computed.

Figure 7:
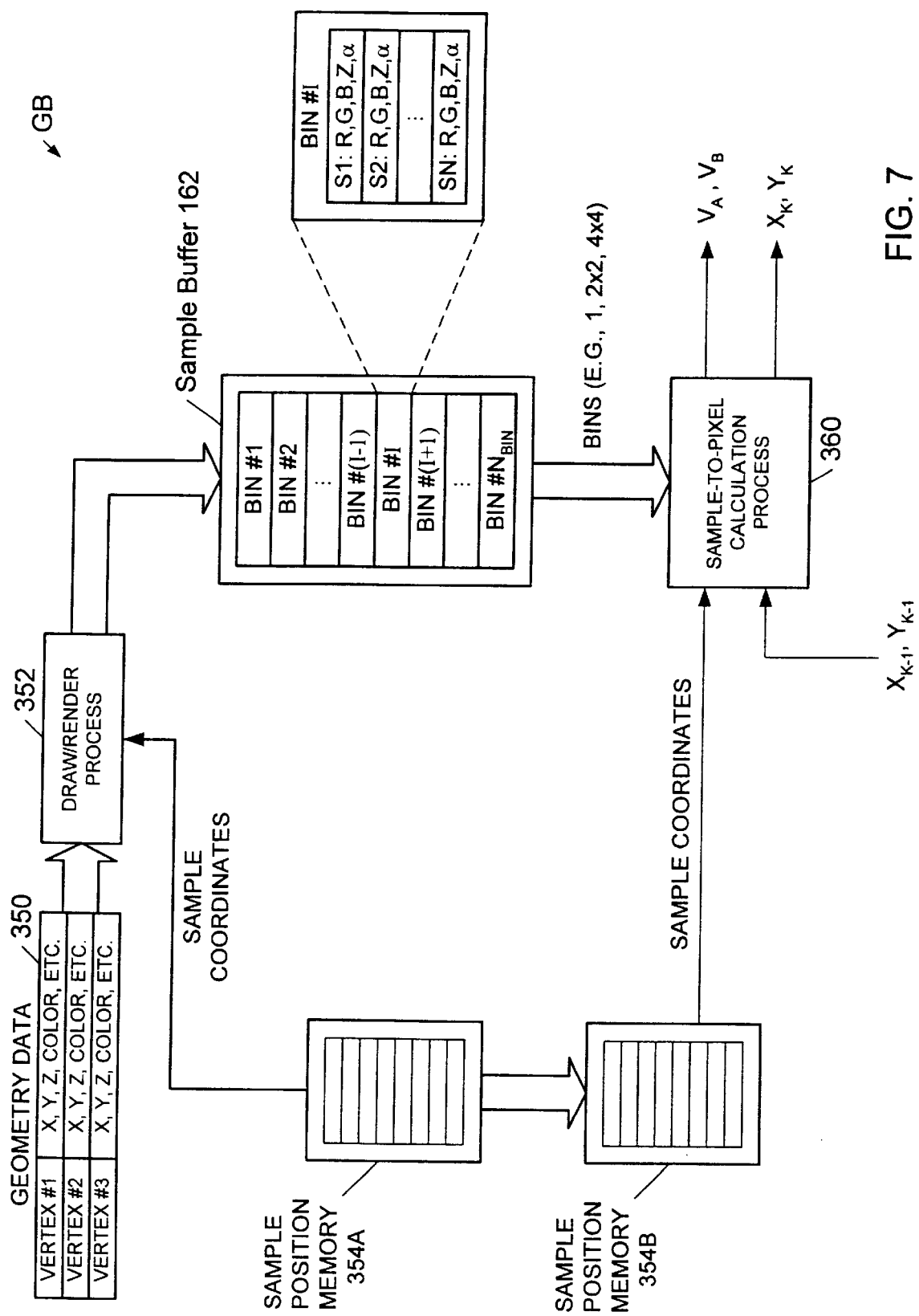
FIG. 7 illustrates another embodiment for the flow of data through graphics board GB.

FIG. 7 illustrates an alternate embodiment of graphics board GB. In this embodiment, two or more sample position memories 354A and 354B are utilized. Sample position memories 354A–B may be used to implement double buffering of sample position data. If the sample positions remain the same from frame to frame, the sample positions may be single-buffered. However, if the sample positions vary from frame to frame, then graphics board GB may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by sample position memory 354A while the other side of memory 354B is accessed by filter process 360. In this configuration, graphics board GB may change sample-positioning schemes on a per-frame basis by shifting the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw process 352 to the filter process 360.

Yet another alternative embodiment may store tags to offsets with the sample values in super-sampled sample buffer 162. These tags may be used to look-up the offset (i.e. perturbations) dX and dY associated with each particular sample.

Figure 8:
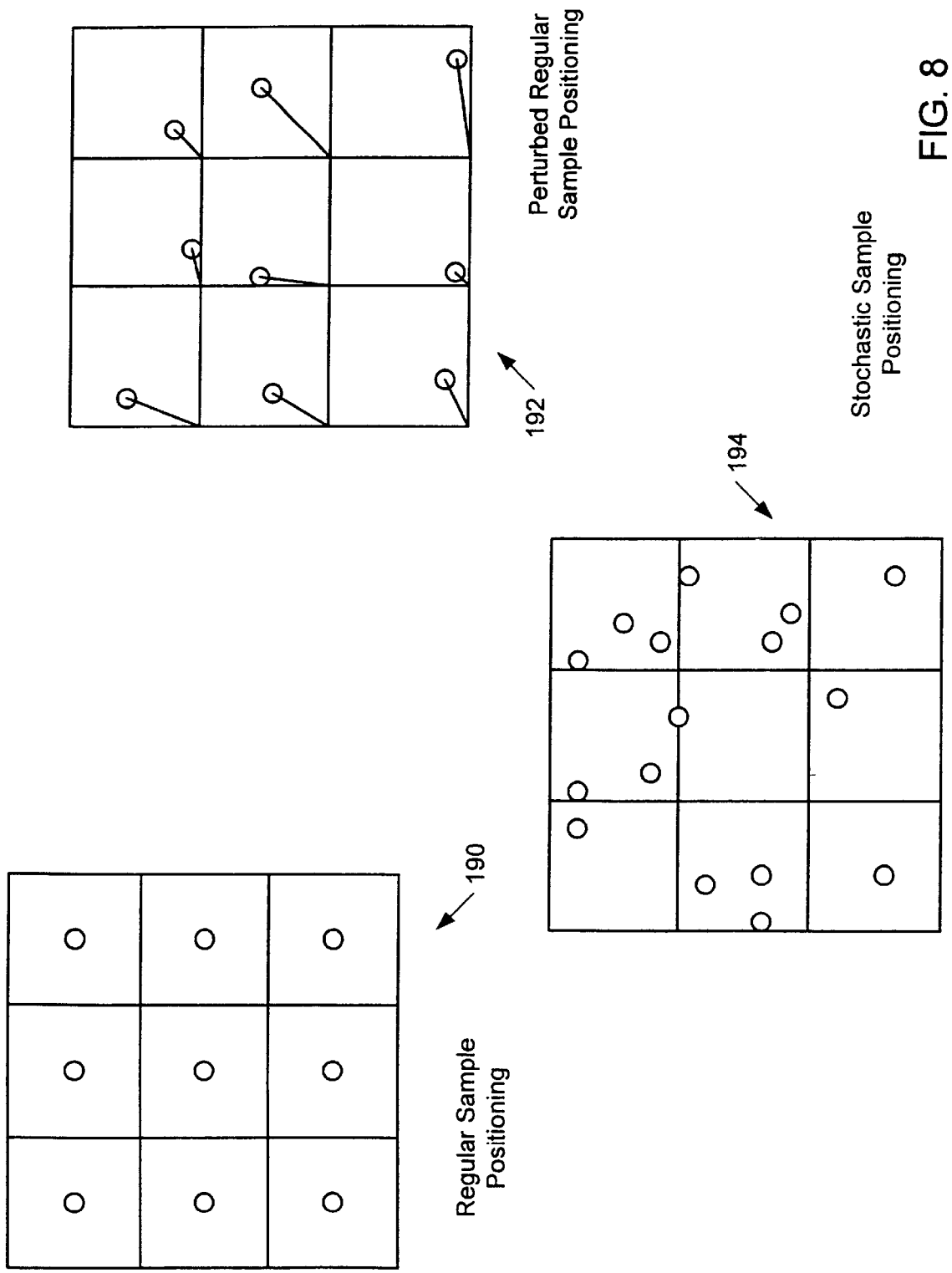
FIG. 8 illustrates three different sample positioning schemes.
Figure 9:
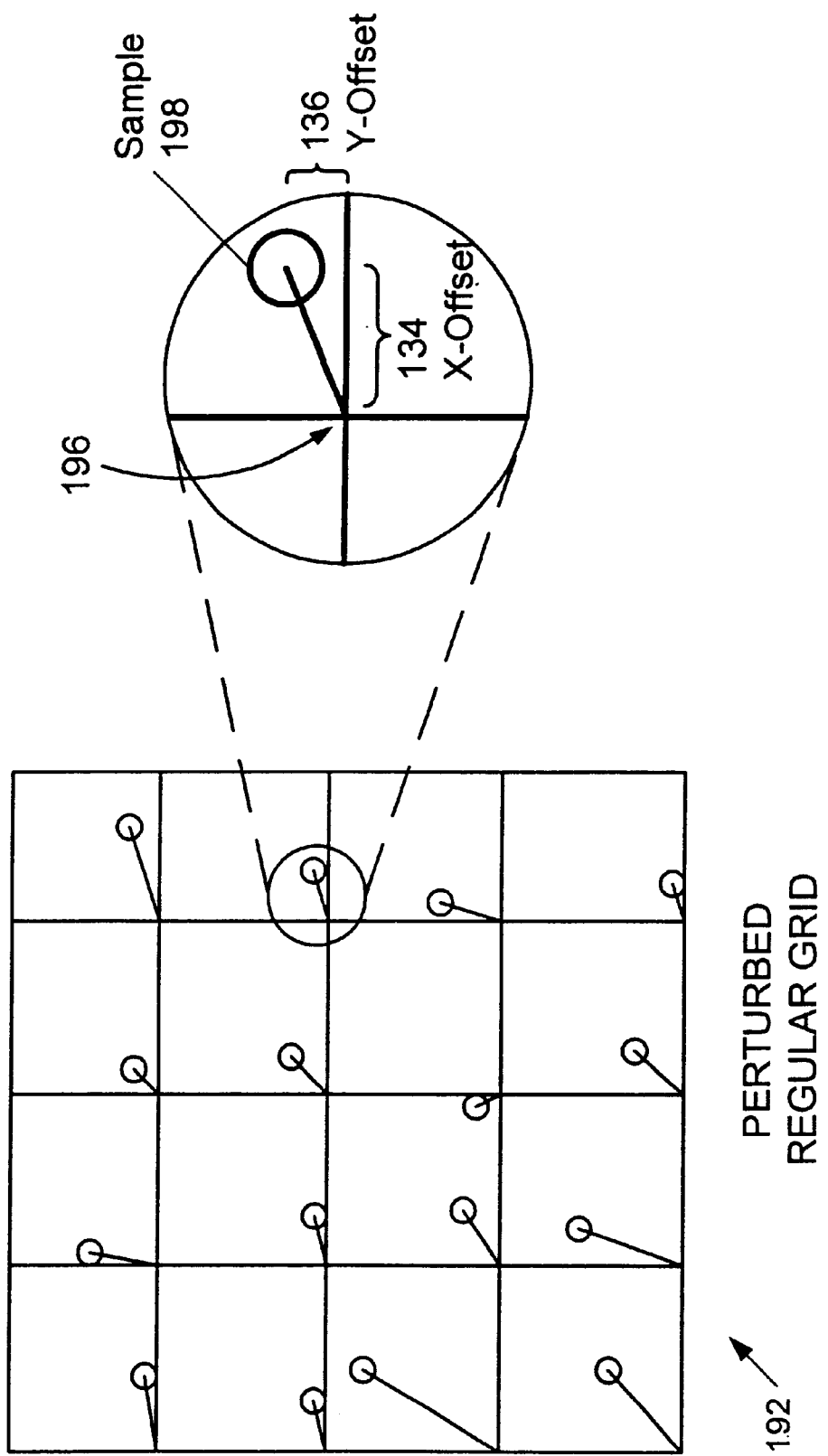
FIG. 9 illustrates one embodiment of a "perturbed regular" sample positioning scheme.
Figure 10:
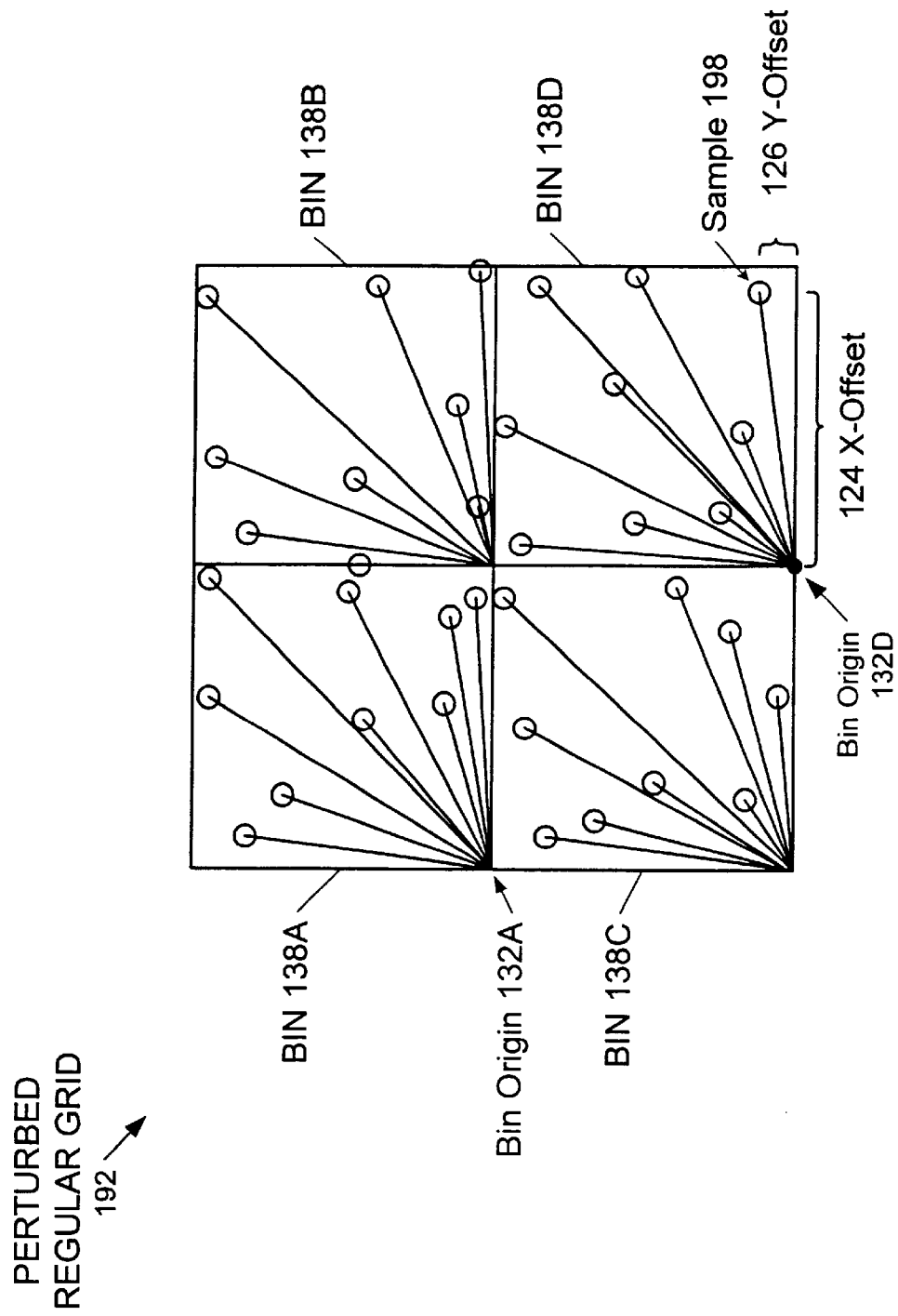
FIG. 10 illustrates another embodiment of the perturbed regular sample positioning scheme.

FIGS. 8–10: Sample Positioning Schemes

FIG. 8 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular grid scheme 192 may be based on any type of regular grid or tiling. Samples generated by perturbation with respect to a grid or hexagonal tiling may be particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Turning now to FIG. 9, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $X_{max}$, where $X_{max}$ is the width of a grid rectangle. Similarly, the y-offset may be limited to the range from zero to $Y_{max}$, where $Y_{max}$ is the height of a grid rectangle. The random offset may also be specified by an angle and radius with respect to the grid intersection point 196.

FIG. 10 illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x-offset and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

Figure 11:
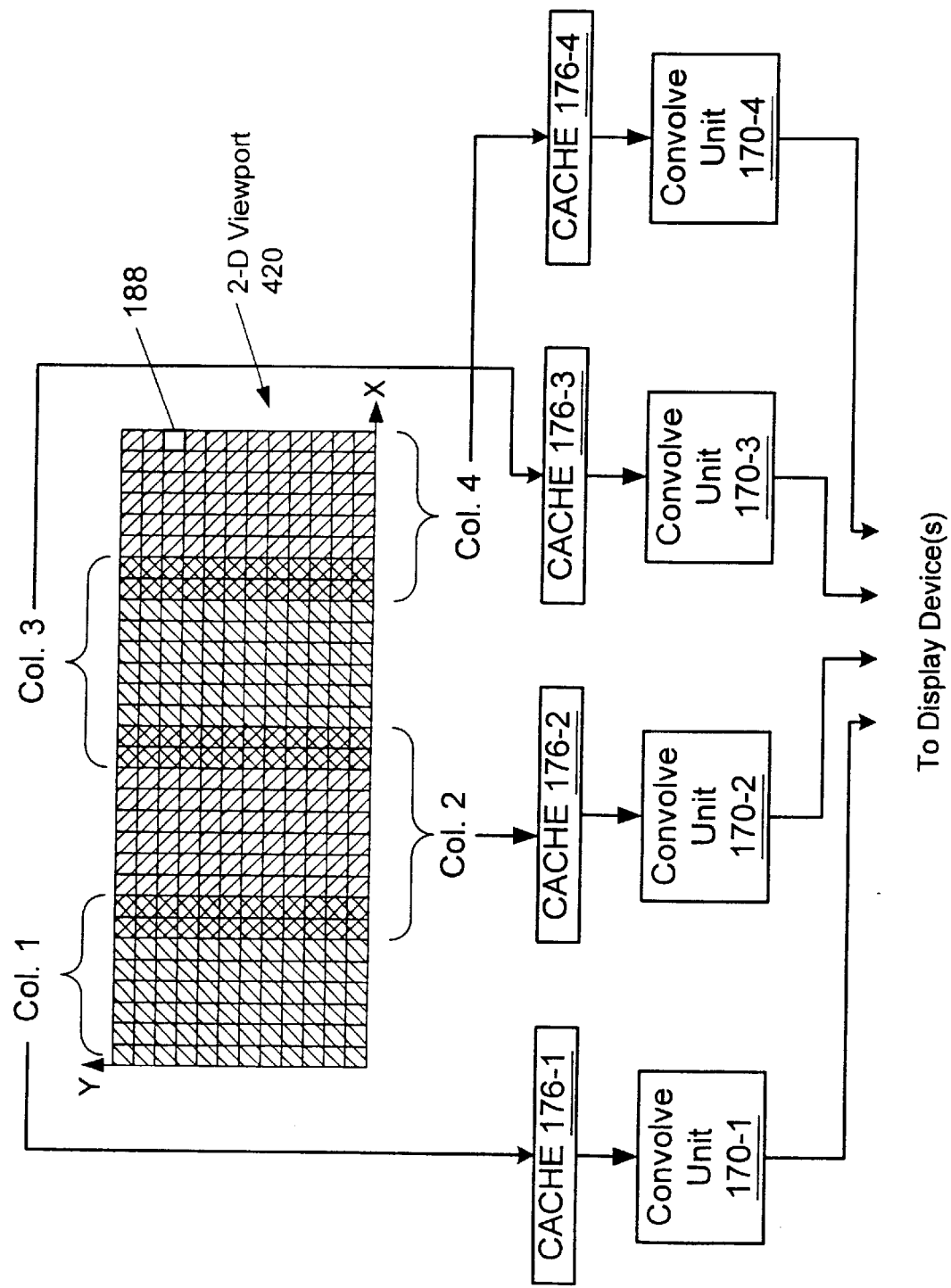
FIG. 11 illustrates one embodiment of a method for the parallel computation of pixel values from samples values.

FIG. 11—Computing Pixels From Samples

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample ordinate values (e.g. red, green, blue, Z, alpha, etc.) for the samples that reside in the corresponding spatial bin. Sample-to-pixel calculation units 170 (also referred to as convolve units 170) are configured to read memory bins from sample buffer 162 and to convert sample values contained within the memory bins into pixel values.

FIG. 11 illustrates one embodiment of a method for rapidly converting sample values stored in sample buffer 162 into pixel values. The spatial bins which cover the 2-D viewport may be organized into columns (e.g., Cols. 1–4). Each column comprises a two-dimensional subarray of spatial bins. The columns may be configured to horizontally overlap (e.g., by one or more spatial bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

FIG. 11 shows four sample-to-pixel calculation units 170 for the sake of discussion. It is noted that graphics board GB may include any number of the sample-to-pixel calculation units 170.

The amount of the overlap between columns may depend upon the horizontal diameter of the filter support for the filter kernel being used. The example shown in FIG. 11 illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns may prevent visual bands or other artifacts from appearing at the column boundaries for any operators larger than a pixel in extent.

Furthermore, the embodiment of FIG. 11 may include a plurality of bin caches 176 which couple to sample buffer 162. In addition, each of bin caches 176 couples to a corresponding one of sample-to-pixel calculation units 170. Bin cache 176-I (where I takes any value from one to four) stores a collection of memory bins from Column I, and serves as a cache for sample-to-pixel calculation unit 170-I. Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 12A:
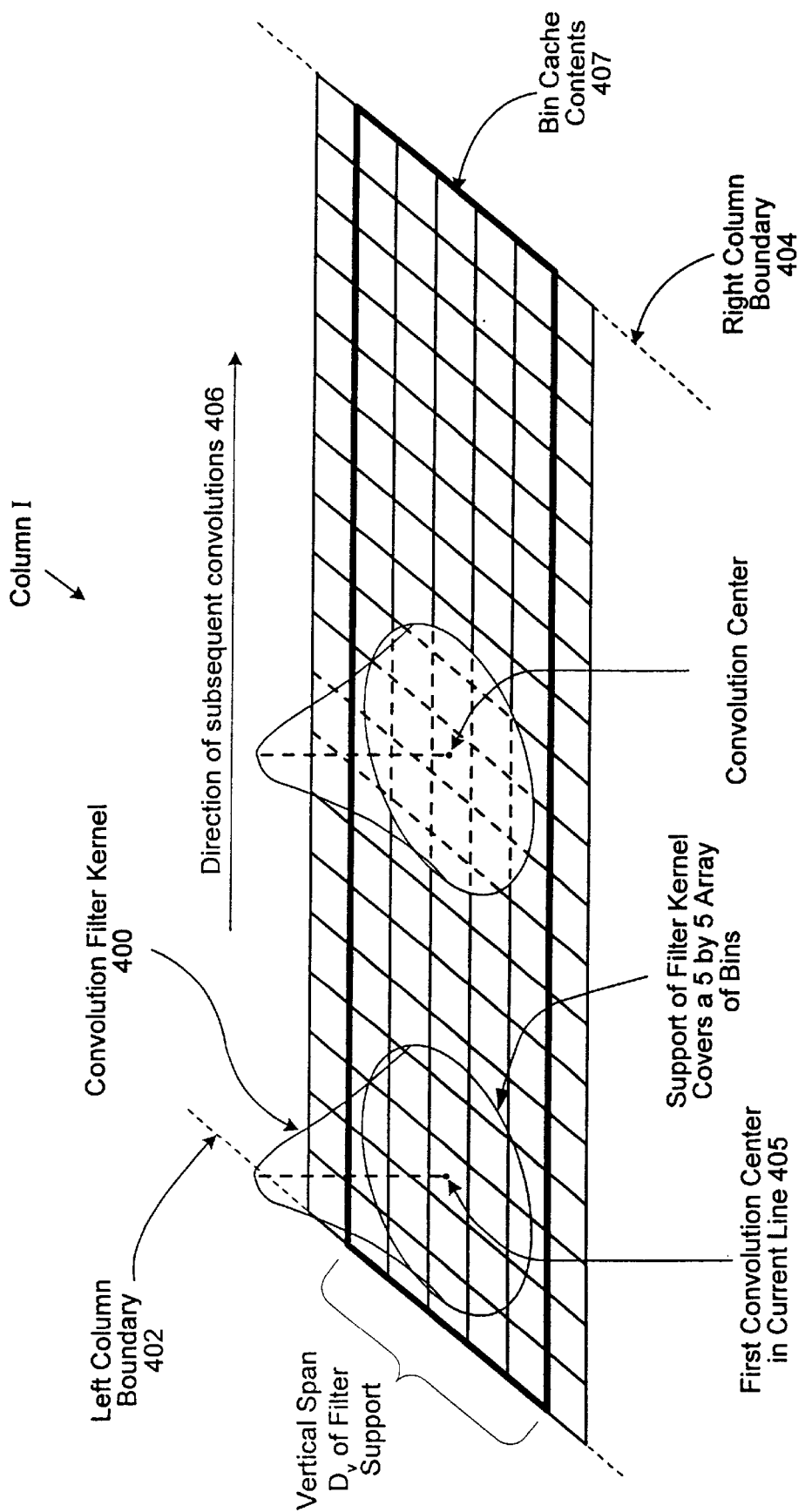
FIG. 12A illustrates one embodiment for the traversal of a filter kernel 400 across a generic Column I of FIG. 11.
Figure 12B:
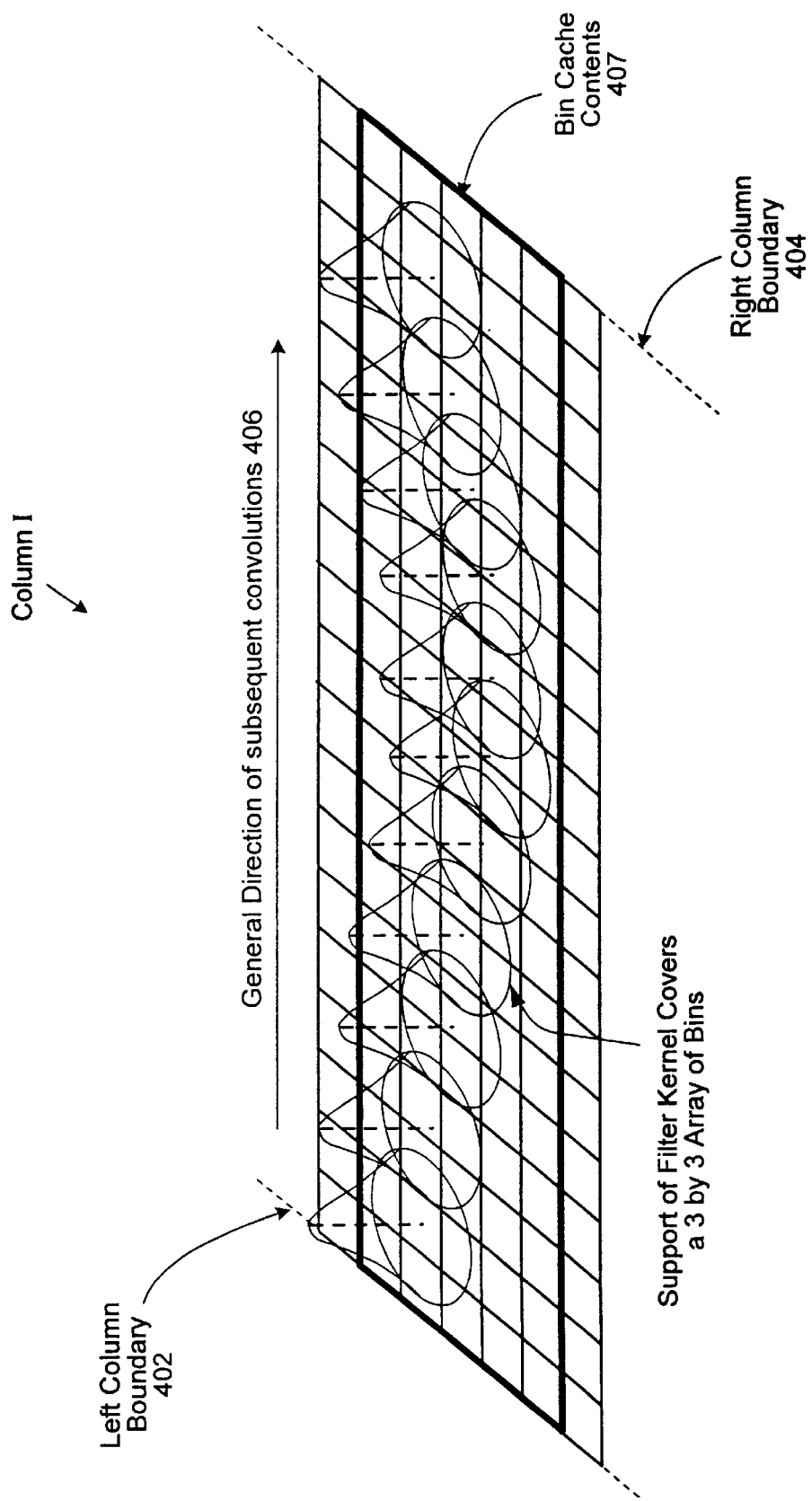
FIG. 12B illustrates one embodiment of a distorted traversal of filter kernel 400 across a generic Column I of FIG. 11.

FIG. 12A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit 170-I may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $D_L$ bin rows of memory bins. The cache line-depth parameter $D_L$ may be chosen to accommodate the support of filter kernel 400. If the support of filter kernel 400 is expected to span no more than $D_v$ bins vertically (i.e. in the Y direction), the cache line-depth parameter $D_L$ may be set equal to $D_v$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $D_L$ is set equal to $D_v+1$. In the example of FIG. 12A, the filter support covers $D_v=5$ bins vertically. Thus, the cache line-depth parameter $D_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $D_L$ were set at the theoretical minimum value $D_v$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit 170-I may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $D_L$ may be set to accommodate the maximum expected vertical deviation of the convolution centers. For example, in FIG. 12B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $D_L$ of at least five (i.e. two plus three).

As mentioned above, Columns 1 through 4 of the 2-D viewport may be configured to overlap horizontally. The size of the overlap between adjacent Columns may be configured to accommodate the maximum expected horizontal deviation of convolution centers from nominal convolution centers on a rectangular grid.

Figure 13A:
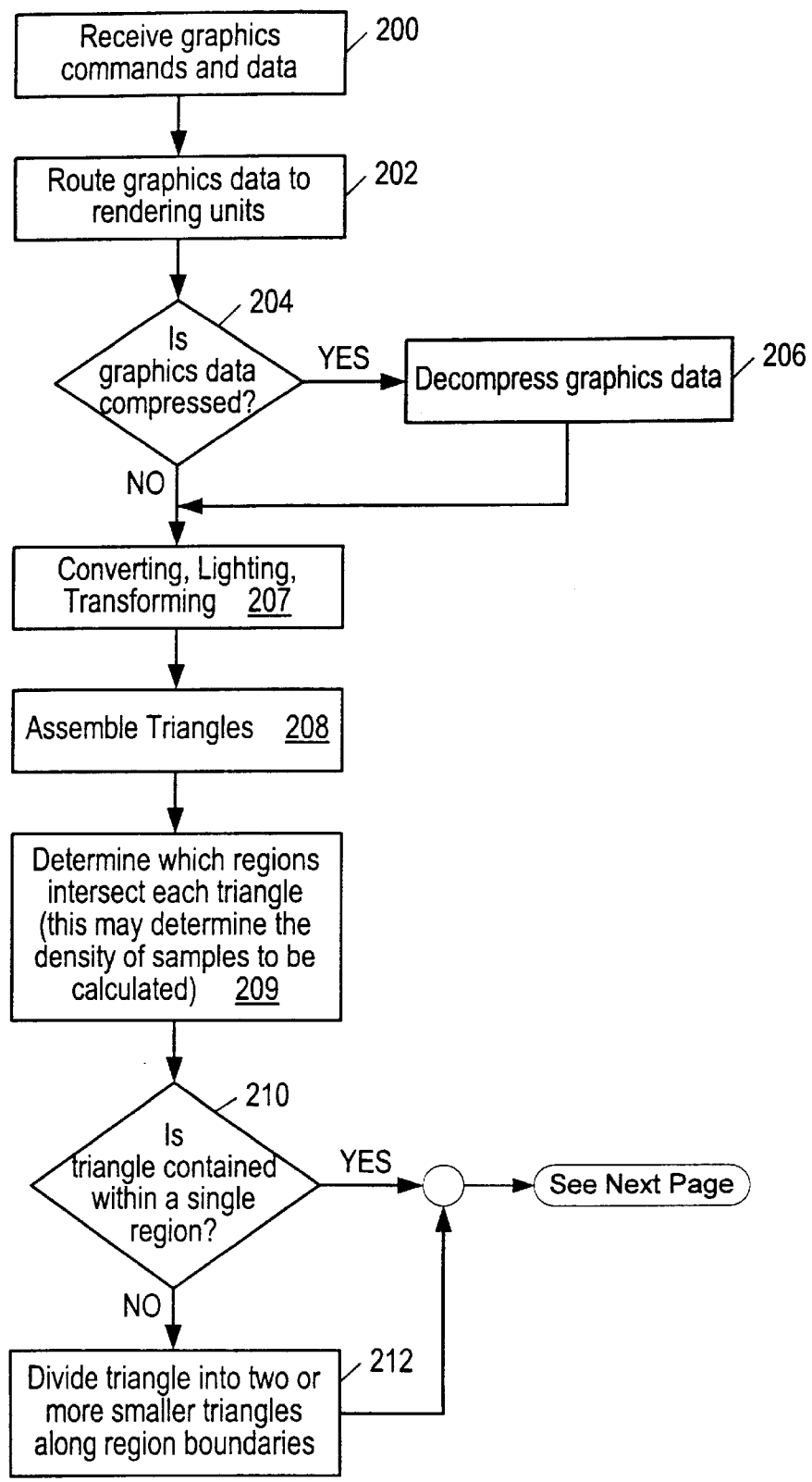
FIGS. 13A and 13B illustrate one embodiment of a method for drawing samples into a super-sampled sample buffer.

FIGS. 13A&B—Rendering Samples into a Super-sampled Sample Buffer

FIGS. 13A&B illustrate one embodiment of a method for drawing or rendering samples into a super-sampled sample buffer. Certain of the steps of FIGS. 13A&B may occur concurrently or in different orders. In step 200, control unit 140 may receive graphics commands and graphics data from the host CPU 102 and/or directly from system memory 106. In step 202, control unit 140 may route the instructions and data to one or more of rendering units 150A–D. In step 204, a rendering unit, say rendering unit 150A for the sake of discussion, may determine if the graphics data is compressed. If the graphics data is compressed, rendering unit 150A may decompress the graphics data into a useable format, e.g., into a stream of vertex data structures, as indicated in step 206. Each vertex data structure may include x, y, and Z coordinate values defining a point in a three dimensional space, and color values. A vertex data structure may also include an alpha value, normal vector coordinates $N_x$, $N_y$ and $N_z$, texture map values, etc.

In step 207, rendering unit 150A may process the vertices and convert the vertices into an appropriate space for lighting and clipping prior to the perspective divide and transform to virtual screen space. In step 208, rendering unit 150A may assemble the stream of vertex data structures into triangles.

If the graphics board GB implements variable resolution super-sampling, rendering unit 150A may compare the triangles with a set of sample-density region boundaries (as indicated in step 209). In variable-resolution super-sampling, different regions of the 2-D viewport may be allocated different sample densities based upon a number of factors (e.g., the center of the attention of an observer on projection screen SCR as determined by eye or head tracking). If the triangle crosses a sample-density region boundary (step 210), then the triangle may be divided into two smaller polygons (e.g. triangles) along the region boundary (step 212). The polygons may be further subdivided into triangles if necessary (since the generic slicing of a triangle gives a triangle and a quadrilateral). Thus, each newly formed triangle may be assigned a single sample density. In one embodiment, rendering unit 150A may be configured to render the original triangle twice, i.e. once with each sample density, and then, to clip the two versions to fit into the two respective sample density regions.

In step 214, rendering unit 150A selects one of the sample positioning schemes (e.g., regular, perturbed regular, stochastic, etc.) from sample position memory 354. In one embodiment, the sample positioning scheme may be pre-programmed into the sample position memory 354. In another embodiment, the sample-positioning scheme may be selected "on the fly".

In step 216, rendering unit 150A may operate on the vertices of a given triangle to determine a subset of spatial bins which, based on their positional relation to the given triangle, may contribute samples that fall within the given triangle. The bins in this subset are referred to herein as candidate bins. In one embodiment, rendering unit 150A may determine a bounding box for the triangle as shown in FIG. 13C, and may use the edge coordinates of the triangle bounding box to determine a minimal bin bounding box, i.e. a rectangle of bins which efficiently contains the triangle bounding box. Thus, the minimal bin bounding box may comprise the subset of candidate bins. In another embodiment, rendering unit 150A may use triangle vertex data to determine a more efficient (i.e. smaller) subset of candidate bins as shown in FIG. 13D. Rendering unit 150A may eliminate bins in the minimal bin bounding box which have empty intersection with the triangle.

In step 218, rendering unit 150A may compute sample positions for each candidate bin by reading positional offsets dX and dY from sample position memory 354, and adding the positional offsets to the coordinates of the corresponding bin origin. The rendering unit may include sample position generation logic to compute the sample positions from the positional offsets and bin origin positions.

Figure 13B:
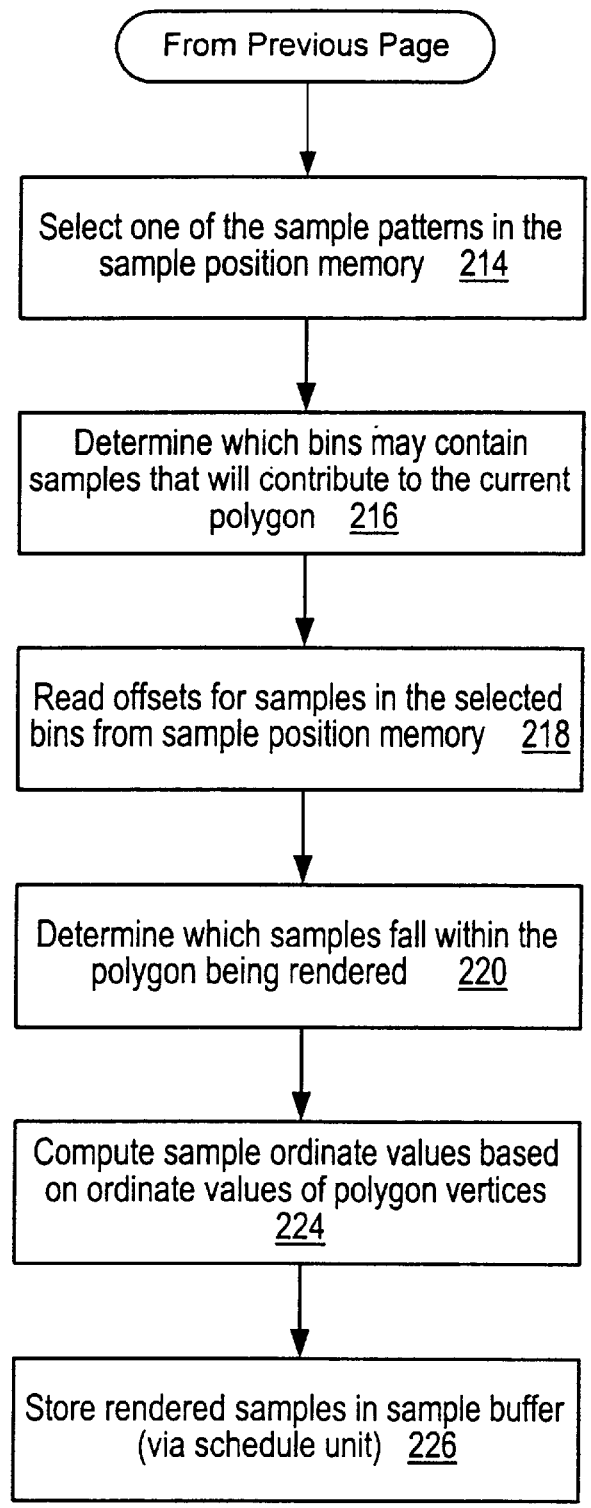
Figure 13C:
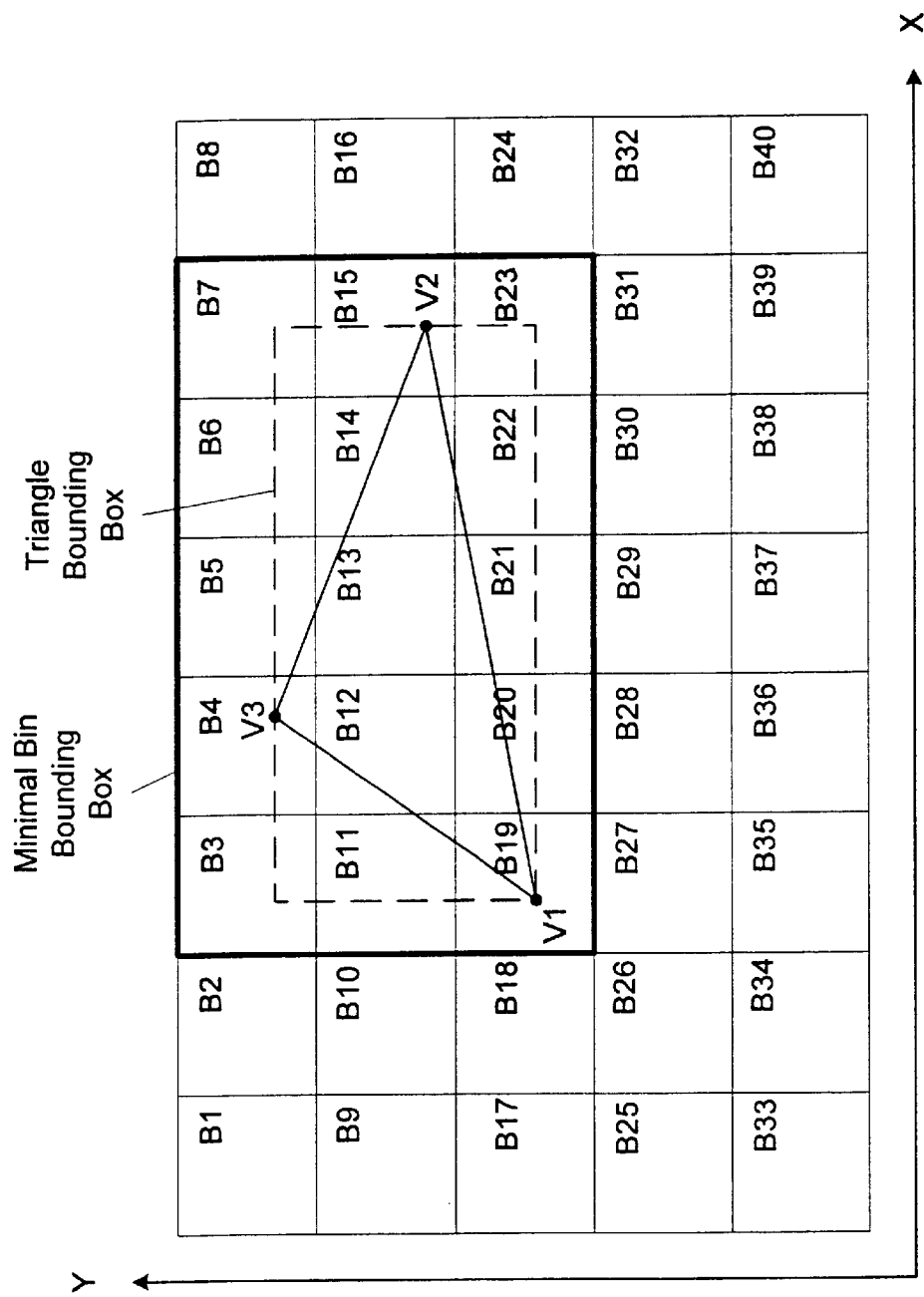
FIG. 13C illustrates a triangle and an array of bins superimposed on a portion of a virtual screen space with a triangle bounding box enclosing the triangle and a bin bounding box enclosing the triangle bounding box.
Figure 13D:
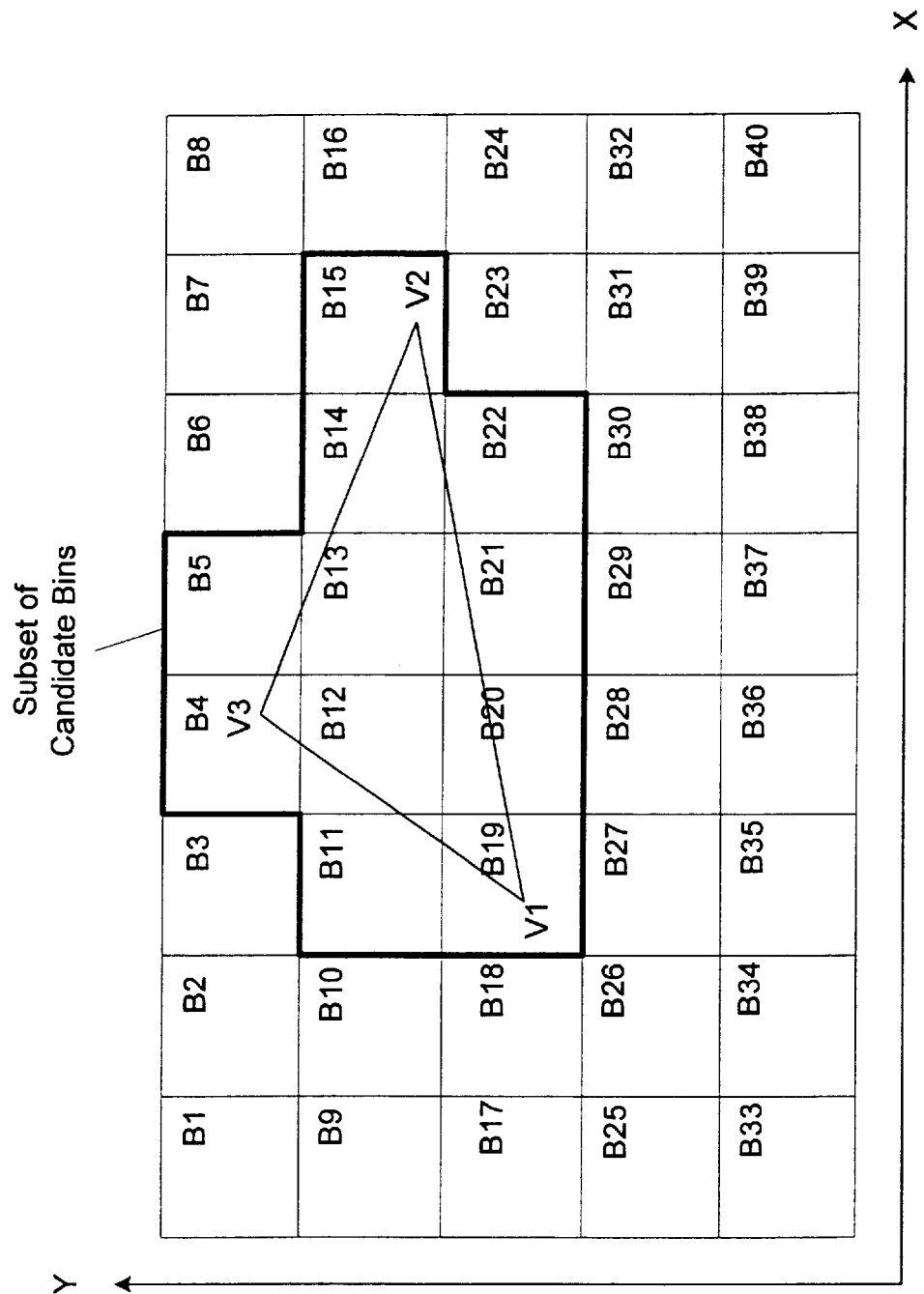
FIG. 13D illustrates an efficient subset of candidate bins containing a triangle in virtual screen space.
Figure 13E:
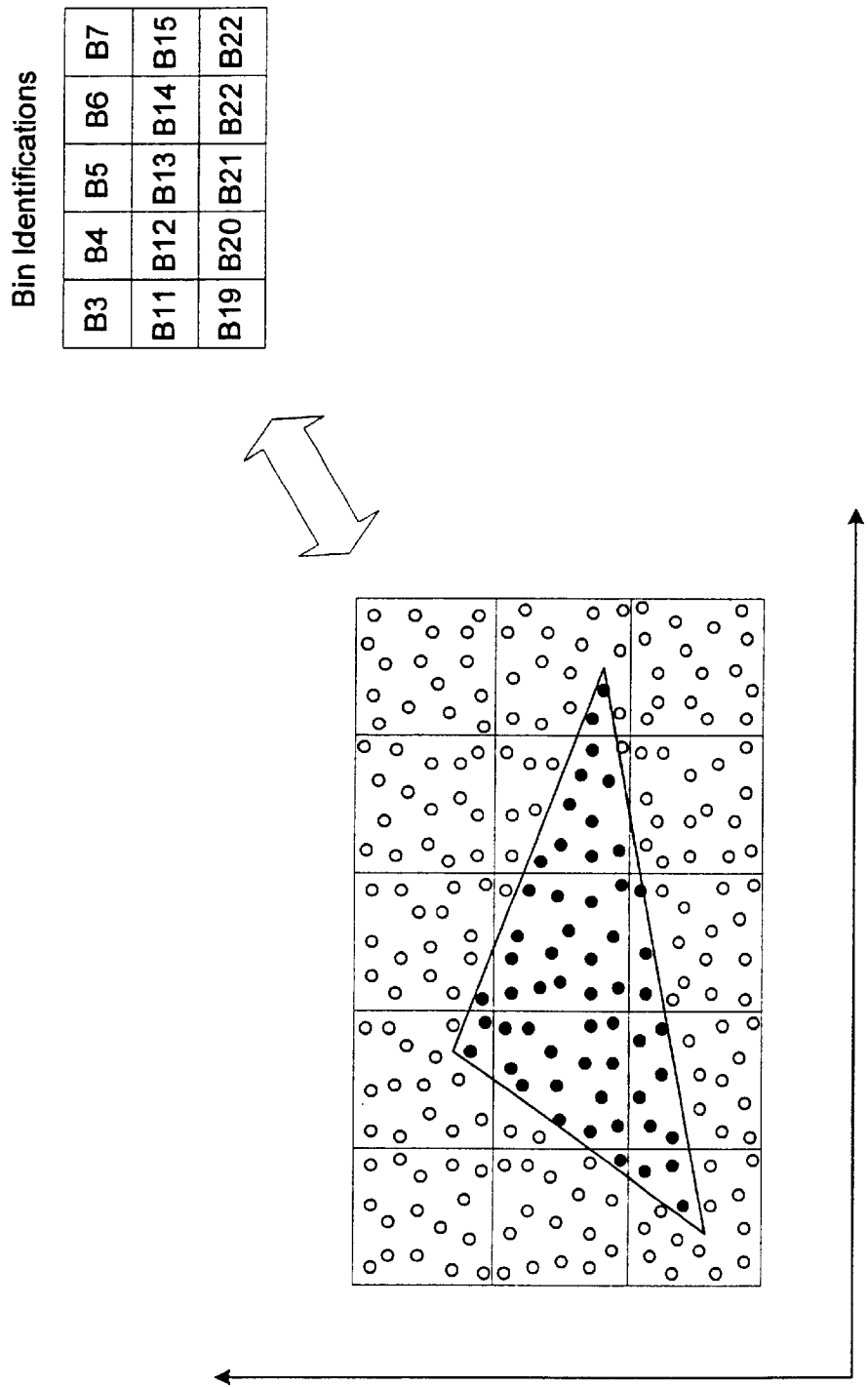
FIG. 13E illustrates a subset of candidate bins in virtual screen space populated with samples, and samples internal to the triangle denoted as solid black dots.

In step 220, rendering unit 150A may examine the positions of samples in the candidate bins to determine if they fall within the given triangle as illustrated in FIG. 13E. Step 220 is discussed in greater detail below.

For each sample that is determined to be within the triangle, rendering unit 150A may interpolate sample ordinate values (e.g. color values, alpha, Z, texture values, etc.) based on the known ordinate values of the vertices of the triangle as indicated in step 224. In step 226, render unit 150A may forward the rendered samples to schedule unit 154, which then stores the samples in sample buffer 162.

The embodiment of the rendering method described above is not meant to be limiting. For example, in some embodiments, two or more of the steps shown in FIGS. 13A–B as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Determination of Samples Residing Within the Polygon Being Rendered

Rendering unit 150A may perform step 220, i.e. may determine which samples in the subset of candidate bins reside within a polygon being rendered, in a number of different ways. The rendering unit may include sample testing logic to implement step 220. In one embodiment, rendering unit 150A may operate on the vertices $V_1$, $V_2$ and $V_3$ of a triangle to determine which samples in the candidate bins reside in the triangle. Each vertex comprises x and y coordinates: $V_1=(x_1, y_1)$, $V_2=(x_2, y_2)$, $V_3=(x_3, y_3)$. Rendering unit 150A may compute x and y displacements between pairs of vertices:

$dx_{12}=x_2-x_1$, $dy_{12}=y_2-y_1$, $dx_{23}=x_3-x_2$, $dy_{23}=y_3-y_2$, $dx_{31}=x_1-x_3$, $dy_{31}=y_1-y_2$,

These x and y displacements represent the x and y components of vector displacements $d_{12}=v_2-v_1$, $d_{23}=v_3-v_2$, $d_{31}=v_1-v_3$, one vector displacement for each edge of the triangle. Observe that the sign bit of x displacement $dx_{ik}$ determines whether vector displacement $d_{ik}$ lies in the right or left half planes of the coordinate plane, and the sign bit of y displacement $dy_{ik}$ determines whether the vector displacement $d_{ik}$ lies in the upper or lower half planes.

Rendering unit 150A may further determine whether each edge is X major or Y major. An edge is said to be X major if the absolute value of its x displacement is larger than the absolute value of its y displacement. Conversely, an edge is said to be Y major if the absolute value of its x displacement is less than the absolute value of its y displacement. Thus, for each vector displacement $d_{ik}$ of the given triangle, rendering unit 150A may compute the absolute value of x displacement $dx_{ik}$ and y displacement $dy_{ik}$, compare the two absolute values, and set an xMajor flag associated with edge Eik in response to the result of the comparison. The larger displacement is referred to as the major axis delta for the edge, and the smaller displacement is referred to as the minor axis delta for the edge.

Figure 14A:
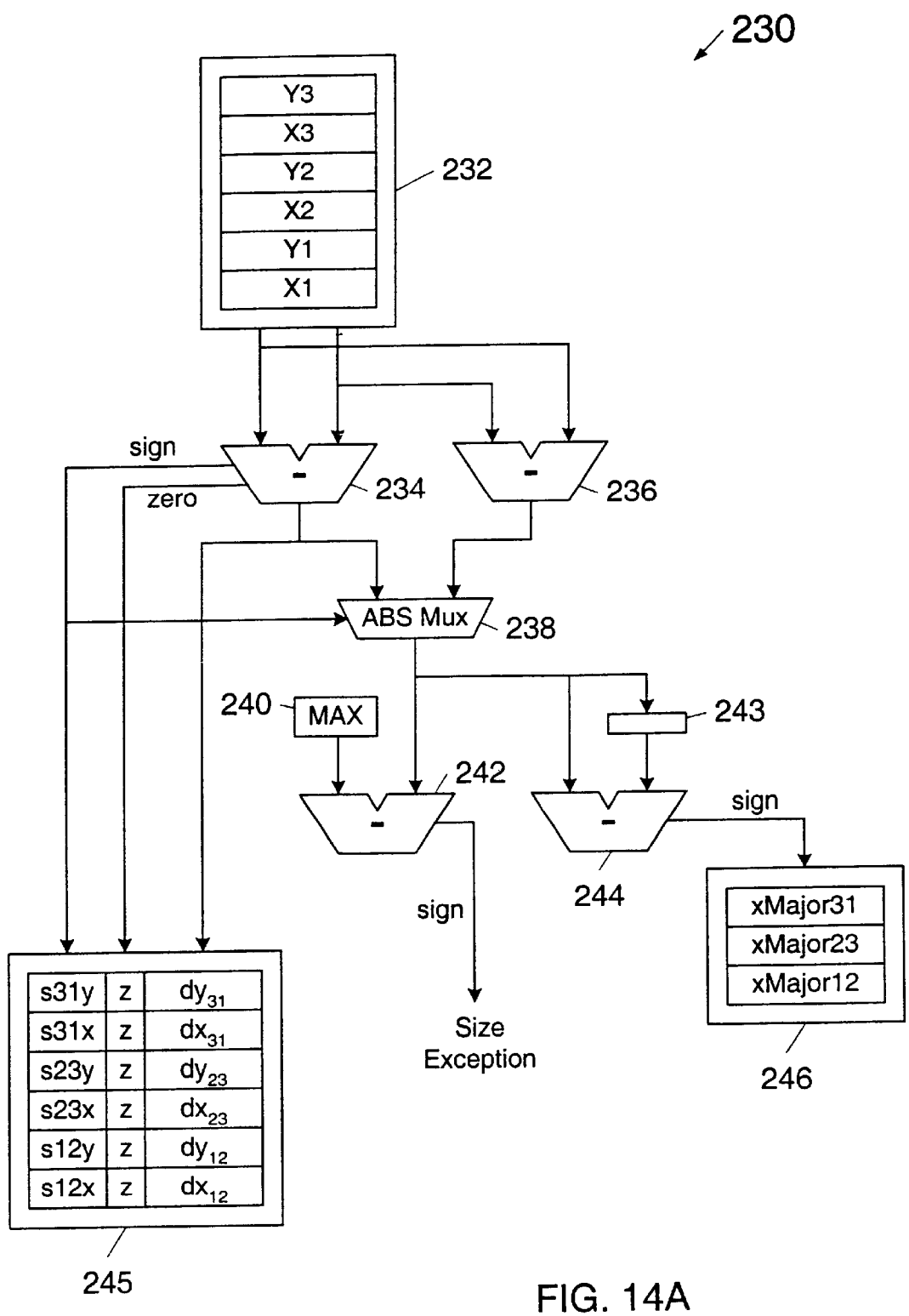
FIG. 14A illustrates one embodiment of an edge delta computation circuit 230 for computing horizontal and vertical edge displacements for each edge of a triangle.

Rendering unit 150A may include an edge delta unit 230 for computing the x and y edge displacements and determining the xMajor flag for each edge Eik as shown in FIG. 14A. Edge delta unit 230 may comprise an input buffer 232, subtractors 234, 236, 242 and 244, a multiplexor 238, a maximum size register 240, a delay unit 243 an output buffer 245 and a flag buffer 246. Input buffer 232 may store the coordinates $x_k$ and $y_k$ of the triangle vertices. Subtractor 234 may compute one of the x and y displacements $dx_{12}$, $dy_{12}$, $dx_{23}$, $dy_{23}$, $dx_{31}$ and $dy_{31}$ in each clock cycle, and stores these displacements in output buffer 245. Subtractor 236 may compute B−A for each difference A−B computed by subtractor 234. Thus, subtractors 234 and 236 generate an x displacement $dx_{ik}$ and its negative respectively in one clock cycle, and a y displacement $dy_{ik}$ and its negative in the next clock cycle. Multiplexor 238 may select the positive of the two opposite signed inputs. Thus, the output of the multiplexor is the absolute value of the x displacement $dx_{ik}$ or y displacement $dy_{ik}$. The multiplexor 238 may be controlled by the sign bit output of subtractor 234. The output of multiplexor 238 may feed an input of subtractor 244 and delay unit 243. Subtractor 244 may compare the absolute value of $dx_{ik}$ to the absolute value $dy_{ik}$. The sign bit output of subtractor 244 may determine the xMajor bit for each edge Eik. The output of multiplexor 238 may also be supplied to subtractor 242. Subtractor 242 may compare the absolute value of x displacement $dx_{ik}$ to a maximum triangle size in a first clock cycle, and compare the absolute value of y displacement $dy_{ik}$ to the maximum triangle size in a second clock cycle. If any of the x or y displacements exceeds the maximum triangle size, the triangle may be sent back to an earlier rendering stage for fragmenting into smaller pieces.

In an alternative embodiment, three edge delta units, one for each edge of the triangle, may operate in parallel, and thus, may generate x and y displacements for the three triangle edges more quickly than edge delta unit 230.

Figure 14B:
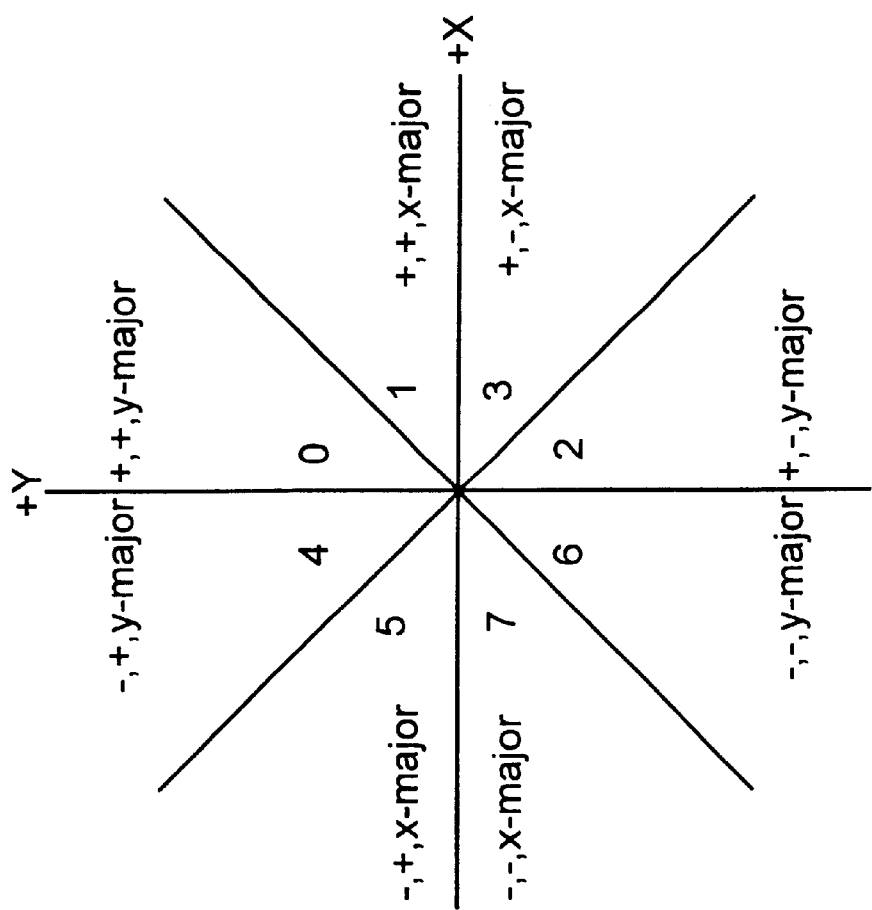
FIG. 14B illustrates one embodiment for partitioning a coordinate space and coding the resulting regions referred to herein as octants.

The coordinate plane may be divided into eight regions (referred to herein as octants) by the coordinate axes and the lines y=x and y=−x as shown in FIG. 14B. The octant in which an edge displacement vector $d_{ik}=(dx_{ik}, dy_{ik})$ belongs may be determined by the sign bit of $dx_{ik}$, the sign bit of $dy_{ik}$ and the xMajor bit for the displacement $d_{ik}$. A three-bit word $A_2A_1A_0$ may be composed by setting bit $A_2$ equal to the sign bit of $dx_{ik}$, setting bit $A_1$ equal to the sign bit of $dy_{ik}$, and setting bit $A_0$ equal to the xMajor bit. Hereafter, the three-bit word $A_2A_1A_0$ is referred to as the octant identifier word. FIG. 14B shows each octant labeled with its corresponding octant identifier word expressed in decimal. It is noted that the assignment of the dx and dy sign bits and the xMajor bit to the bit positions of the octant identifier word is arbitrary. Other assignments are contemplated.

In one embodiment, rendering unit 150A may examine the sign bits of the x displacements $dx_{12}$, $dx_{23}$ and $dx_{31}$ to determine how the vertex coordinates $x_1$, $x_2$ and $x_3$ are ordered along the x axis, and examine the sign bits of y displacements $dy_{12}$, $dy_{23}$ and $dy_{31}$ to determine how the vertex coordinates $y_1$, $y_2$ and $y_3$ are ordered along the y axis. Thus, rendering unit 150A may determine edge coordinates for the triangle bounding box as follows:

gBBoxUx=$x_{max}$, gBBoxLx=$x_{min}$, gBBoxUy=$y_{max}$, gBBoxLy=$y_{min}$, where $x_{max}$ is a maximum of the values $x_1$, $x_2$ and $x_3$, $x_{min}$ is a minimum of the values $x_1$, $x_2$ and $x_3$, $y_{max}$ is a maximum of the values $y_1$, $y_2$ and $y_3$, and $y_{min}$ is a minimum of the values $y_1$, $y_2$ and $y_3$. Rendering unit 150A may compute the width gBBoxX and height gBBoxY of the triangle bounding box according to the relations gBBoxX=gBBoxUx−gBBoxLx, gBBoxY=gBBoxUy−gBBoxLy.

Rendering unit 150A may compare values gBBoxX and gBBoxY to determine the triangle's controlling edge. The controlling edge is the edge that has the largest major axis delta.

Figure 14C:
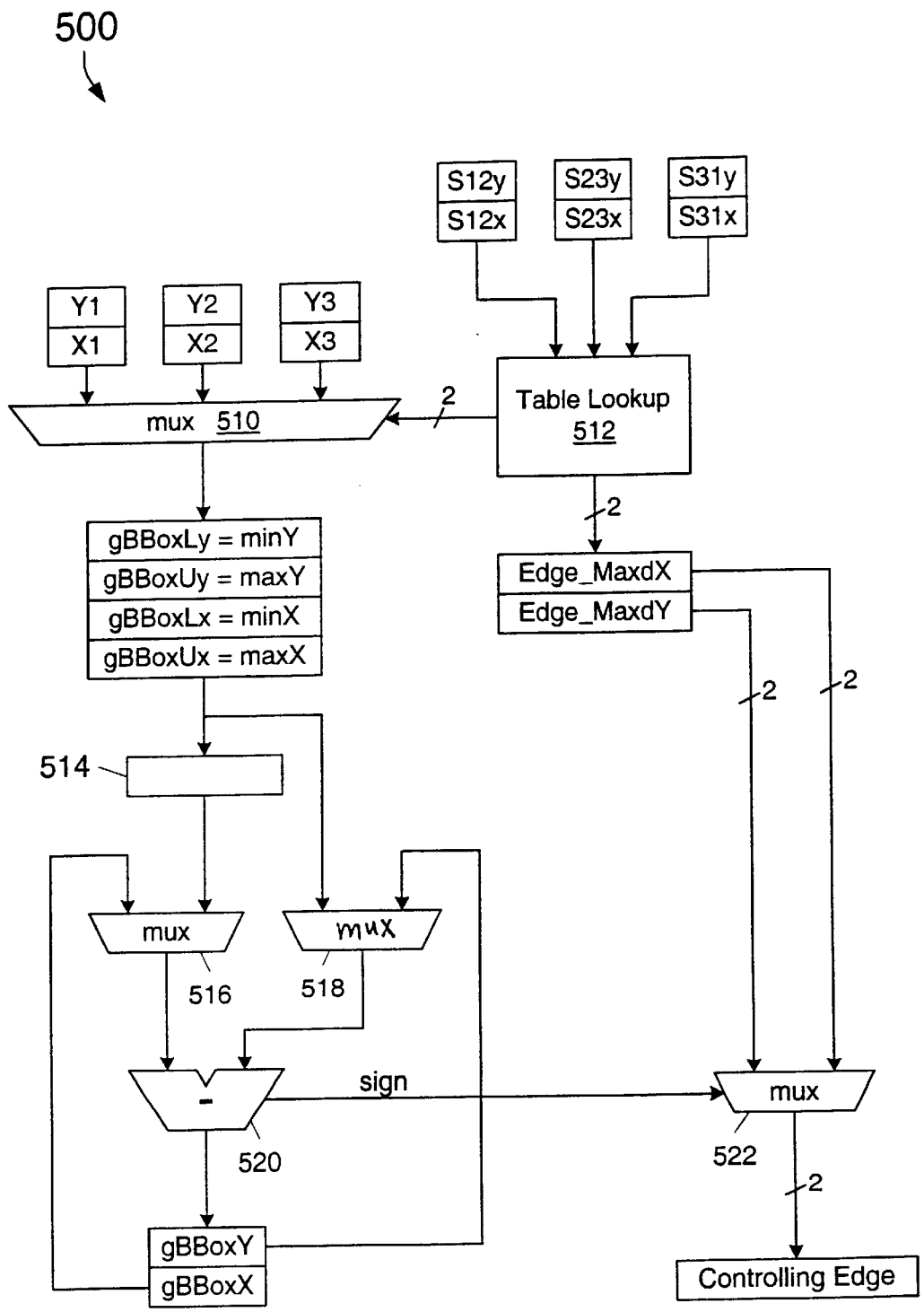
FIG. 14C illustrates one embodiment of a feedback network 500 for computing the width and height of the triangle bounding box and for determining the controlling edge of the triangle.

In one embodiment, rendering unit 150A may comprise a feedback network 500 for determining the width and height of the triangle bounding box, and the controlling edge. One embodiment of feedback network 500 is shown in FIG. 14C. Feedback network may include a multiplexor 510, table lookup unit 512, delay unit 514, multiplexors 516 and 518, subtract unit 520, and multiplexor 522.

In a first clock cycle, table lookup unit 512 uses the sign bits of the x displacements $dx_{12}$, $dx_{23}$ and $dx_{31}$ to lookup a two-bit code defining the edge having the largest x displacement, and a two-bit code for the vertex having the maximum x coordinate among the three vertices of the triangle. Multiplexor 510 receives the x coordinates $x_1$, $x_2$ and $X_3$ as input, and outputs the value $x_{max}$ in response to the selection indicated by table lookup unit 512. The value $x_{max}$ is assigned to the value gBBoxUx.

In a second clock cycle, table lookup unit 512 uses the sign bits of the x displacements $dx_{12}$, $dx_{23}$ and $dx_{31}$ to lookup a two-bit code for the vertex having the minimum x coordinate among the three vertices of the triangle. Multiplexor 510 receives the x coordinates $x_1$, $x_2$ and $X_3$ as input, and outputs the value $x_{min}$ in response to the selection indicated by table lookup unit 512. The value $x_{min}$ is assigned to the value gBBoxLx.

In a third clock cycle, table lookup unit 512 uses the sign bits of the y displacements $dy_{12}$, $dy_{23}$ and $dy_{31}$ to lookup a two-bit code defining the edge having the largest y displacement, and a two-bit code for the vertex having the maximum y coordinate among the three vertices of the triangle. Multiplexor 510 receives the y coordinates $y_1$, $Y_2$ and $y_3$ as input, and outputs the value $y_{max}$ in response to the selection indicated by table lookup unit 512. The value $y_{max}$ is assigned to the value gBBoxUy. Multiplexors 516 and 518 feed subtraction unit 520 with the values gBBoxUx and gBBoxLx respectively, and subtraction unit 520 computes the bounding box width gBBoxX=gBBoxUx−gBBoxLx. Delay unit 514 operates to delay the value gBBoxUx until value gBBoxLx is available.

In a fourth clock cycle, table lookup unit 512 uses the sign bits of the y displacements $dy_{12}$, $dy_{23}$ and $dy_{31}$ to lookup a two-bit code for the vertex having the minimum y coordinate among the three vertices of the triangle. Multiplexor 510 receives the y coordinates $y_1$, $y_2$ and $y_3$ as input, and outputs the value $y_{min}$ in response to the selection indicated by table lookup unit 512. The value $y_{min}$ is assigned to the value gBBoxLy.

In a fifth clock cycle, multiplexors 516 and 518 feed the values gBBoxUy and gBBoxLy respectively to subtraction unit 520. Subtraction unit 520 computes the difference gBBoxY=gBBoxUy−gBBoxLy. In a sixth clock cycle, multiplexors 516 and 518 feed the values gBBoxX and gBBoxY respectively to subtraction unit 520. Subtraction unit 520 computes the difference gBBoxX−gBBoxY. Multiplexor 522 receives the two bit code for the edge Edge_MaxdX with maximum x displacement, and the two bit code for the edge Edge_MaxdY with maximum y displacement. Multiplexor 522 outputs the value Edge_MaxdX if the subtraction unit 520 indicates that the difference gBBoxX−gBBoxY is non-negative, and the value Edge_MaxdY otherwise. The output of multiplexor 522 determines the controlling edge, i.e. the edge having the largest major axis delta (i.e. displacement).

Rendering unit 150A may use the triangle bounding box coordinates gBBoxUx, gBBoxLx, gBBoxUy and gBBoxLy to generate coordinates for a bin bounding box. See FIG. 13C. In one embodiment, bin boundaries occur on vertical lines given by x equal to any integer and on the horizontal lines given by y equal to any integer. In this case, rendering unit 150A may compute bin bounding box values according to the relations bBBMaxX=ceil(gBBoxUx), bBBMinX=floor(gBBoxLx), bBBMaxY=ceil(gBBoxUy), bBBMinY=floor(gBBoxLy), where ceil(*) denotes the ceiling (or rounding up) function, and floor(*) denotes the floor (or rounding down) function.

Rendering unit 150A may compute new coordinates for the vertices and the triangle bounding box relative to a corner of the bin bounding box according to the relations $relX_k = x_k − bBBMinX$, $relY_k = y_k − bBBMinY$, relMaxX=gBBoxUx−bBBoxMinX, relMinX=gBBoxLx−bBBoxMinX, relMaxY=gBBoxUy−bBBoxMinY, relMinY=gBBoxLx−bBBoxMinY.

By computing relative coordinates, rendering unit 150A may use smaller adders and multipliers in succeeding computational stages.

Rendering unit 150A may compute parameters m and b for a line equation y=mx+b or x=my+b for each edge of the triangle depending on whether the edge is X major or Y major, i.e. depending on the value of the xMajor flag for the edge. If an edge $E_{ik}$ is X major, rendering unit 150A may compute parameters $m_{ik}$ and $b_{ik}$ for the line equation in the form $y=m_{ik}x+b_{ik}$, i.e. $m_{ik}=dy_{ik}*(1/dx_{ik})$ and $b_{ik}=y_k−m*x_k$. If the edge Eik is Y major, rendering unit 150A may compute parameters $m_{ik}$ and $b_{ik}$ for the line equation in the form $x=m_{ik}y+b_{ik}$, i.e. $m_{ik}=dx_{ik}*(1/dy_{ik})$ and $b_{ik}=x_k−m*y_k$. By computing the slope and intercept for each edge in this major-sensitive fashion, slopes are guaranteed to be between negative one and one. It is noted that the reciprocal values $(1/dx_{ik})$ and $(1/dy_{ik})$ may be computed by lookup in a ROM table. Also, the intercept values $b_{ik}$ may be computed in terms of relative x and y coordinates, i.e. $b_{ik}=relY_k−m*relX_k$ or $b_{ik}=relX_k−m*relY_k$. In this fashion, smaller adders and multipliers may be used to compute the intercepts. Henceforth, wherever rendering computations involving x and y vertex coordinate values are presented, it is to be understood that the corresponding relative x and y vertex coordinate values may be used instead in some embodiments.

Given an X-major edge Eik with edge equation y=mx+b, the inequality $$y − mx − b < 0 \qquad (1)$$

is true if and only if the point (x,y) resides below the line given by y=mx+b. Conversely, the inequality $$y − mx − b > 0 \qquad (2)$$

is true if and only if the point (x,y) resides above the line given by y=mx+b. The interior of the triangle lies either above or below the line y=mx+b. The side (i.e. half plane) which contains the triangle interior is referred to herein as the interior side or the "accept" side. The accept side may be represented by an ACCEPT flag. The ACCEPT flag is set to zero if the interior side is below the line y=mx+b, and is set to one if the interior side is above the line. A given sample S with coordinates $(x_S, y_S)$ is on the accept side of the edge Eik if the expression $$(y_S − m*x_S − b < 0) \text{ XOR ACCEPT}$$

is true.

Given a Y-major edge Eik with edge equation x=my+b, the inequality $$x − my − b < 0 \qquad (3)$$

is true if and only if the point (x,y) resides to the left of the line given by x=my+b. Conversely, the inequality $$x − my − b > 0 \qquad (4)$$

is true if and only if the point (x,y) resides to the right of the line given by x=my+b. Again, the accept side (i.e. interior side) of the line may be represented by an ACCEPT flag. A sample S with coordinates $(x_S, y_S)$ is on the accept side of the edge Eik if the expression $$(x_S − m*y_S − b < 0) \text{ XOR ACCEPT}$$

is true.

Rendering unit 150A may perform inequality testing on the samples in the candidate bins as described above for all three edges of the given triangle. If a sample lies on the accept side (i.e. the interior side) of all three edges, it is in the interior of the triangle, and rendering unit 150A may set a VALID bit for the sample. If the sample lies outside the triangle, the sample lies on the exterior side of one or more edges.

Rendering unit 150A may implement these sample-testing computations in hardware (e.g. in an ASIC chip). In one embodiment, rendering unit 150A may include one or more sample test circuits. A sample test circuit may comprise a multiplier, two subtraction units, an XOR gate and two multiplexors. The sample test circuit may receive as input the x and y coordinates of a sample, the m and b parameters for a given edge, the ACCEPT bit and the xMajor bit for the edge. The multiplexors may receive the x and y coordinates as inputs, and provide output values j and n. The multiplexors may pass the inputs to the outputs with exchange (j=y and n=x) or without exchange (j=x and n=y) depending on the state of the xMajor bit. The multiplier may compute the product m*j, and the first subtraction unit may compute the difference n−b. The second subtraction unit may compute the expression EXP=(n−b)−(m*j). The expression EXP may be stored in memory for use in a later rendering stage. The XOR gate may receive the sign bit from the second subtraction unit and the ACCEPT flag, and may generate an EDGE_VALID bit.

In one embodiment, rendering unit 150A may comprise three sample test circuits, one for each edge, operating in parallel on the samples of the candidate bins. The sample test circuit which operates on edge Eik receives the corresponding ACCEPT flag and the corresponding xMajor flag. A three-input AND circuit may compute the logical AND of the three EDGE_VALID bits, one for each edge. The output of the three-input AND circuit may determine a VALID bit for the input sample. The VALID bit specifies whether or not the sample is inside or outside the triangle.

In one embodiment, the accept side (i.e. the interior side) for each edge may be determined from the orientation flag CW for the triangle and the octant identifier word for the displacement vector corresponding to the edge. A triangle is said to have clockwise orientation if a path traversing the edges in the order V3, V2, V1 moves in the clockwise direction. Conversely, a triangle is said to have counter-clockwise orientation if a path traversing the edges in the order V3, V2, V1 moves in the counter-clockwise direction. It is noted the choice of vertex order for the orientation definition is arbitrary, and other choices are contemplated.

The ACCEPT bit for an edge Eik may be determined by the following table based on (a) the octant identifier word $A_2A_1A_0$ of the displacement vector $d_{ik}$ corresponding to the edge Eik, and (b) orientation flag CW for the triangle, where clockwise traversal is indicated by CW=1 and counter-clockwise traversal is indicated by CW=0. The notation "!" denotes the logical complement. The octant identifier words are given as decimal values zero through seven.

TABLE

Interior Side Resolution Table

1: ACCEPT = !CW
0: ACCEPT = CW
4: ACCEPT = CW
5: ACCEPT = CW
7: ACCEPT = CW
6: ACCEPT = !CW
2: ACCEPT = !CW
3: ACCEPT = !CW

Tie breaking rules for this representation may also be implemented. For example, an edge displacement vector $d_{ik}$ which lies on one of the coordinate axes may be defined as belonging to the adjacent octant with positive sign along the complementary coordinate. Thus, a displacement vector $d_{ik}$ on the negative y-axis would belong to octant 2 because octant 2 is associated with positive x coordinate. An edge displacement vector $d_{ik}$ which resides on a line of slope m=1 or −1 may be defined as belonging to the adjacent X major octant.

Rendering unit 150A may determine the orientation flag CW of a triangle by table-lookup in an orientation table which is addressed by the octant identifier words for vector displacements $d_{13}$ and $d_{23}$. An illustration of the orientation table is provided in FIG. 14D. $W_{13}$ denotes the octant identifier word for displacement $d_{13}$, and $W_{23}$ denotes the octant identifier word for displacement $d_{23}$. The octant identifier word $W_{23}$ addresses the rows of the orientation table, and octant identifier word $W_{13}$ addresses the columns of the orientation table. The octant identifier words are given as decimal values. The entries in the orientation table are values for the orientation flag. It is noted that the orientation flag CW may be tabulated with respect to any two of the vector edge displacements $d_{12}$, $d_{23}$ and $d_{31}$.

As an example of the orientation table lookup, suppose that vector displacement $d_{13}$ resides in octant 1 (i.e. $W_{13}$=1) and vector displacement $d_{23}$ resides in octants 0, 4 or 5 (i.e. $W_{23}$=0, 4 or 5). In these cases, the given triangle has clockwise orientation (i.e. CW=1). If, however, vector displacement $d_{23}$ reside in octants 6, 2, or 3 (i.e. $W_{23}$=6, 2, or 3), the triangle has counter-clockwise orientation (i.e. CW=0).

It is noted that certain entries in the table denoted with the symbol ">" or "<=". These special entries occur where vector displacements $d_{13}$ and $d_{23}$ occupy either the same octant (i.e. $W_{13}$=$W_{23}$) or opposite octants. In these special cases, it is necessary to examine the slopes $m_{12}$ and $m_{23}$ of the vector displacements $d_{13}$ and $d_{23}$ respectively. As described above, rendering unit 150A may compute each slope by dividing the change in minor axis coordinate by the change in major axis coordinate along the corresponding vector displacement. The minor axis of a vector displacement [edge] is the axis complementary to the major axis of the vector displacement [edge].

In the special cases, rendering unit 150A may compute the orientation flag CW according to one of the following equations:

$$CW=(W_{23}==W_{13})!=(m_{23}>m_{13}), \quad (5)$$

$$CW=(W_{23}==W_{13})!=(m_{23}<=m_{13}). \quad (6)$$

The symbol "!=" denotes the NOT EQUAL operator. The symbol "==" denotes the EQUAL operator. The symbol "<=" denotes the LESS THAN OR EQUAL operator. Rendering unit 150A may use equation (5) to determine the orientation flag CW in those special cases which are denoted by the ">" symbol. Rendering unit 150A may use equation (6) to determine the orientation flag CW in those special cases which are denoted by the "<=" symbol. Equation (5) specifies that the orientation flag CW equals one (corresponding to clockwise orientation) only if (a) the octants defined by the displacement vectors $d_{13}$ and $d_{23}$ are the same and (b) the slope $M_{23}$ is not greater than slope $m_{13}$, or, (c) the octants defined by the displacement vectors are different and (d) the slope $m_{23}$ is greater than slope $m_{13}$. Equation (6) specifies that the orientation flag CW equals one (corresponding to clockwise orientation) only if (e) the octants defined by the displacement vectors $d_{13}$ and $d_{23}$ are the same and (f) the slope $m_{23}$ is greater than slope $m_{13}$, or, (g) the octants defined by the displacement vectors are different and (h) the slope $m_{23}$ is less than or equal to slope $m_{13}$.

If the slopes $m_{13}$ and $m_{23}$ are the same, then the triangle is degenerate (i.e., with no interior area). Degenerate triangles can be explicitly tested for and culled, or, with proper numerical care, they may be forwarded to succeeding rendering stages as they will cause no samples to render. One special case arises when a triangle splits the view plane. However, this case may be detected earlier in the rendering pipeline (e.g., when front plane and back plane clipping are performed).

Note that this method of orientation lookup only uses one additional comparison (i.e., of the slope $m_{13}$ of edge13 to the slope $m_{23}$ of edge23) beyond factors already computed.

In most cases, only one side of a triangle is rendered. Thus, if the orientation of a triangle determined by the analysis above is the one to be rejected, then the triangle can be culled.

Figure 15A:
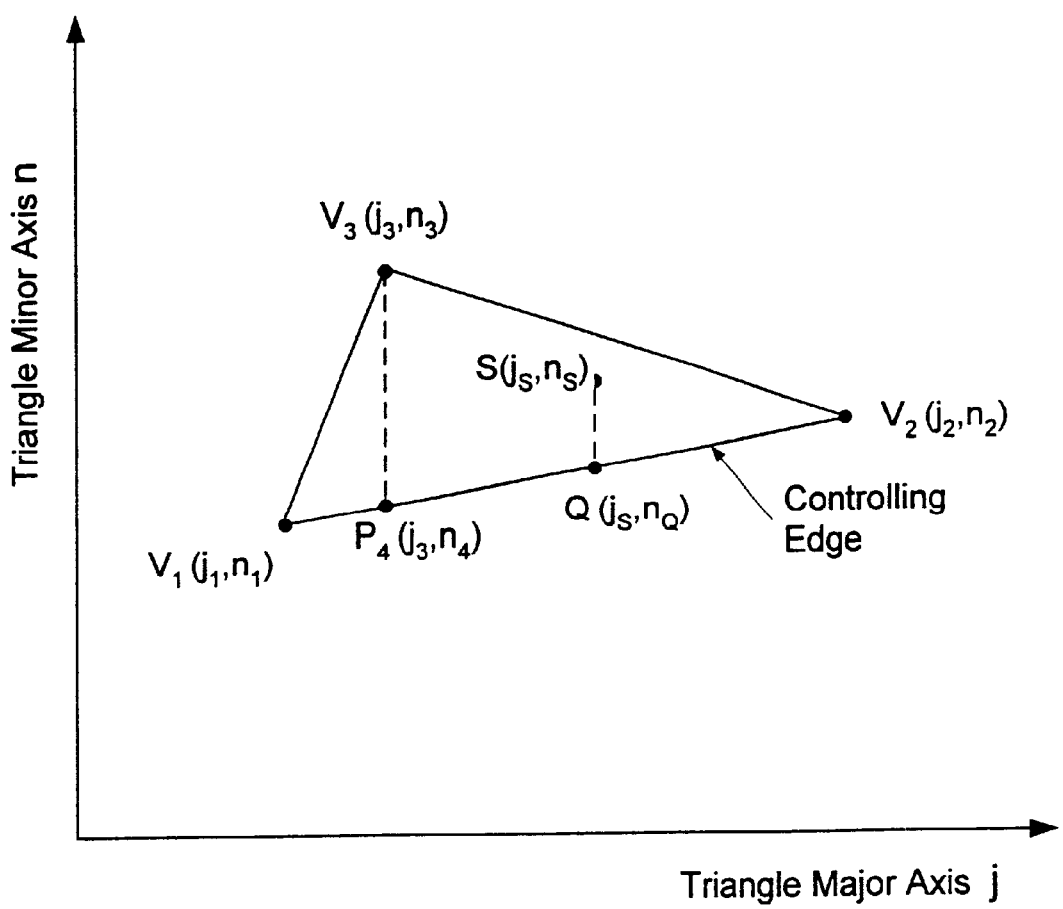
FIG. 15A illustrates one embodiment of a method for computing sample ordinate values based on known ordinate values at the vertices of a given triangle.

FIG. 15A: Interpolating Sample Ordinate Values

As described above in connection with step 224 of FIG. 13B, rendering unit 150A may compute ordinate values (e.g. red, green, blue, alpha, Z, etc.) for samples which have been identified (in step 220) as residing inside the given triangle. Render unit 150A may include sample ordinate generation logic to perform the computations associated with step 224. FIG. 15A illustrates one embodiment of the ordinate value computation for a given triangle. Vertices $V_1$, $V_2$ and $V_3$ of the triangle may be stored in a RAM buffer, e.g., in memory 156. Each vertex $V_k=(x_k, y_k)$ has an associated ordinate vector $H_k$ containing ordinate values for the vertex $V_k$. In one embodiment, each ordinate vector $H_k$ comprises red, green, blue, alpha and Z values for vertex $V_k$, i.e.

$H_1=(R_1, G_1, B_1, A_1, Z_1, \ldots)$, $H_2=(R_2, G_2, B_2, A_2, Z_2, \ldots)$ $H_3=(R_3, G_3, B_3, A_3, Z_3, \ldots)$ Each ordinate vector $H_k$ may also include texture values. The ordinate vectors $H_1$, $H_2$ and $H_3$ may also be stored in the RAM buffer. Rendering unit 150A may compute a vector $H_S$ of ordinate values for each sample S inside the given triangle based on the coordinates $(x_S, y_S)$ of the sample, the coordinates of vertices $V_1$, $V_2$ and $V_3$, and the ordinate vectors $H_1$, $H_2$ and $H_3$. Rendering unit 150A may compute ordinate vector $H_S$ for a sample only if the sample is inside the triangle as indicated by the sample VALID flag.

As described above, rendering unit 150A may determine the controlling edge for the triangle, i.e. the edge having the largest major axis delta. Without loss of generality, assume that edge E12 from vertex $V_1$ to vertex $V_2$ is the controlling edge as shown in FIG. 15A. The vertex $V_3$ which is opposite the controlling edge may be projected onto the controlling edge to generate an auxiliary point $P_4$. Similarly, a sample S may be projected onto the controlling edge to generate a projection point Q. Both projections may be along lines parallel to the triangle's minor axis. The minor axis n of the triangle is defined to be the minor axis of the controlling edge. Similarly, the major axis j of the triangle is defined to be the major axis of the controlling edge. In other words, if the controlling edge is X major, j=x and n=y. Conversely, if the controlling edge is Y major, j=y and n=x. As viewed in the (j,n) coordinate system, the sample point S is defined by the coordinate pair $(j_S, n_S)$, and each vertex $V_k$ is defined by the coordinate pair $(j_k, n_k)$. Thus, $j_S=x_S$, $n_S=y_S$, $j_k=x_k$ and $n_k=y_k$ if the triangle is X major. Conversely, $j_k=y_k$ and $n_k=x_k$ if the triangle is Y major.

The projection point Q is defined by the coordinate pair $(j_S, n_Q)$. Observe that the projection point Q has the same j-coordinate as the sample point S. The auxiliary point $P_4$ is defined by the coordinate pair $(j_3, n_4)$. Observe that the auxiliary point $P_4$ has the same j-coordinate as the vertex $V_3$.

Rendering unit 150A may compute a red value $R_4$ for auxiliary point $P_4$ by interpolating with respect to the vertices $V_1$ and $V_2$ of the controlling edge. In other words, rendering unit 150A may compute the red value $R_4$ according to the equation $$R_4=R_1+(R_2-R_1)*(j_3-j_1)/(j_2-j_1), \quad (7)$$

where $R_1$ and $R_2$ are the red values for vertices $V_1$ and $V_2$ respectively, $j_3$ is the major axis coordinate of the vertex $V_3$, $j_1$ is the major-axis coordinate of vertex $V_1$, and $j_2$ is the major-axis coordinate of vertex $V_2$.

Rendering unit 150A may compute the n-coordinate $n_4$ of the auxiliary point $P_4$ by evaluating the line equation $n=m_{12}*j+b_{12}$ for the controlling edge at the j-coordinate $j_3$ of the auxiliary point $P_4$, i.e.

$$n_4=m_{12}*j_3+b_{12}. \quad (8)$$

In the preferred embodiment, the slope $m_{12}$ and intercept $b_{12}$ for the controlling edge are available from a previous computation, e.g., from the sample inclusion testing step 220 of FIG. 13B.

Rendering unit 150A may compute a rate of change of red along the n-direction according to the equation $$dR/dn=(R_3-R_4)/(n_3-n_4), \quad (9)$$

where $R_3$ denotes the red value associated with vertex $V_3$.

Rendering unit 150A may compute a red value $R_Q$ for projection point Q by interpolating with respect to the vertices $V_1$ and $V_2$ of the controlling edge. In other words, rendering unit 150A may compute the red value $R_Q$ according to the equation $$R_Q=R_1+(R_2-R_1)*(j_S-j_1)/(j_2-j_1), \quad (10)$$

where $R_1$ and $R_2$ are the red values for vertices $V_1$ and $V_2$ respectively, $j_S$ is the j-coordinate of the sample point S.

Rendering unit 150A may compute the minor axis displacement $n_S-n_Q$ between the sample and projection point Q according to the relation $$n_S-n_Q=n_S-b_{12}-m_{12}*j_S. \quad (11)$$

In some embodiments, the quantity $(n_S-n_Q)$ may already be available, having been computed as part of sample inclusion testing step 220 of FIG. 13B. See the discussion of edge testing and the sample test circuit described above.

Rendering unit 150A may compute a red value $R_S$ for the sample point S based on the red value $R_Q$ of the projection point Q and the rate of change dR/dn along the minor axis direction according to the equation $$R_S=R_Q+(dR/dn)*(n_S-n_Q), \quad (12)$$

where $n_S$ denotes the n-coordinate of the sample point S.

Observe that the red rate of change dR/dn depends only on data associated with the vertices of the triangle, and not on data associated with the sample S. Thus, rate dR/dn may be computed once in a triangle setup unit (or during a triangle setup phase), and used repeatedly to compute red sample values $R_S$ for all samples residing inside the triangle. The red value $R_Q$ of the projection point Q depends on the j-coordinate $j_S$ of the sample point S as shown in equation (10). However, the factor $K_R=(R_2-R_1)/(j_2-j_1)$ in the computation of the red value $R_Q$ depends only on data associated with vertices $V_1$ and $V_2$. Thus, the factor $K_R$ may also be pre-computed in the triangle setup unit (or during the triangle setup phase), and used repeatedly to compute the projection red value $R_Q$ for each sample inside the triangle.

The discussion above may be summarized as follows. Rendering unit 150A may compute a red minor axis rate of change dR/dn and a factor $K_R$ according to the equations:

$$n_4=m_{12}*j_3+b_{12}, \quad (13)$$

$$K_R=(R_2-R_1)*1/(j_2-j_1), \quad (14)$$

$$R_4=R_1+K_R*(j_3-j_1), \quad (15)$$

$$dR/dn=(R_3-R_4)*1/(n_3-n_4) \quad (16)$$

where $m_{12}$ is the slope of the controlling edge, i.e. $m_{12}=(n_2-n_1)/(j_2-j_1)$, and $b_{12}$ is the minor axis intercept of the controlling edge, i.e. $b_{12}=j_2-m*n_2$. Then, for each sample S in the interior of the triangle, rendering unit 150A may compute a red value $R_S$ according to the equations:

$$R_Q=R_1+K_R*(j_S-j_1), \quad (17)$$

$$R_S=R_Q+(dR/dn)*(n_S-n_Q). \quad (18)$$

As noted above, the quantity $(n_S-n_Q)$ may be read from memory, having been computed in sample inclusion testing step 220 of FIG. 13B.

The computation of the red sample value $R_S$ described above serves as a model for the computation of any of the ordinate values for sample S. Let C represent any ordinate value (e.g. red, green, blue, alpha, Z, etc.). Thus, the vertices $V_1$, $V_2$ and $V_3$ have values for ordinate C which are denoted $C_1$, $C_2$ and $C_3$ respectively. Rendering unit 150A may compute a rate of change dC/dn and a factor $K_C$ according to the equations:

$$K_C=(C_2-C_1)*1/(j_2-j_1), \quad (19)$$

$$C_4=C_1+K_C*(j_3-j_1), \quad (20)$$

$$dC/dn=(C_3-C_4)*1/(n_3-n_4). \quad (21)$$

Note that the quantity $(j_3-j_1)$ in equation (20) may already be available, having been determined as discussed above in the edge displacement computations. In other words, quantity $(j_3-j_1)$ equals either $dx_{13}$ or $dy_{13}$. For example, see the discussion of edge delta circuit 14A. In addition, the quantity $1/(j_2-j_1)$ in equation (19) may already be available, having been determined as part of the edge slope computations discussed above. Thus, these quantities may be accessed from memory or internal registers when performing the computations associated with equations (19) and (20). Observe that the value $n_4$ given by equation (13) does not depend on ordinate data. Thus, value $n_4$ may be computed once per triangle and repeatedly used in equation (21) for all ordinates C.

For each sample S in the interior of the triangle, rendering unit 150A may compute a value $C_S$ for the sample S according to the equations:

$$C_Q=C_1+K_C*(j_S-j_1), \quad (22)$$

$$C_S=C_Q+(dC/dn)*(n_S-n_Q). \quad (23)$$

In one embodiment, rendering unit 150A may comprise an ordinate setup unit OSU to compute minor axis rate dC/dn and factor $K_C$. The ordinate setup unit OSU may receive values $j_1$, $j_2$, $j_3$, $C_1$, $C_2$, $C_3$, $n_3$ and $n_4$ as inputs, and generate values dC/dn and $K_C$ as outputs according to equations (19)–(21). In some embodiments, one ordinate setup unit OSU may compute minor axis rate dC/dn and factor $K_C$ for all ordinate values C, i.e. for C successively equal to red, blue, green, alpha, Z, etc. In other embodiments, a plurality of ordinate setup units OSUs may be used to compute minor axis rates dC/dn and factors $K_C$. For example, rendering unit 150A may comprise separate ordinate setup units for red, green, blue, alpha, Z, etc. In this case, the ordinate setup units may operate in parallel.

Rendering unit 150A may further comprise an auxiliary coordinate evaluator which receives slope $m_{12}$, intercept $b_{12}$ and coordinate $j_3$ and computes the quantity $n_4$ according to equation (13). The auxiliary coordinate evaluator may supply the one or more ordinate setup units with the quantity $n_4$.

Figure 15B:
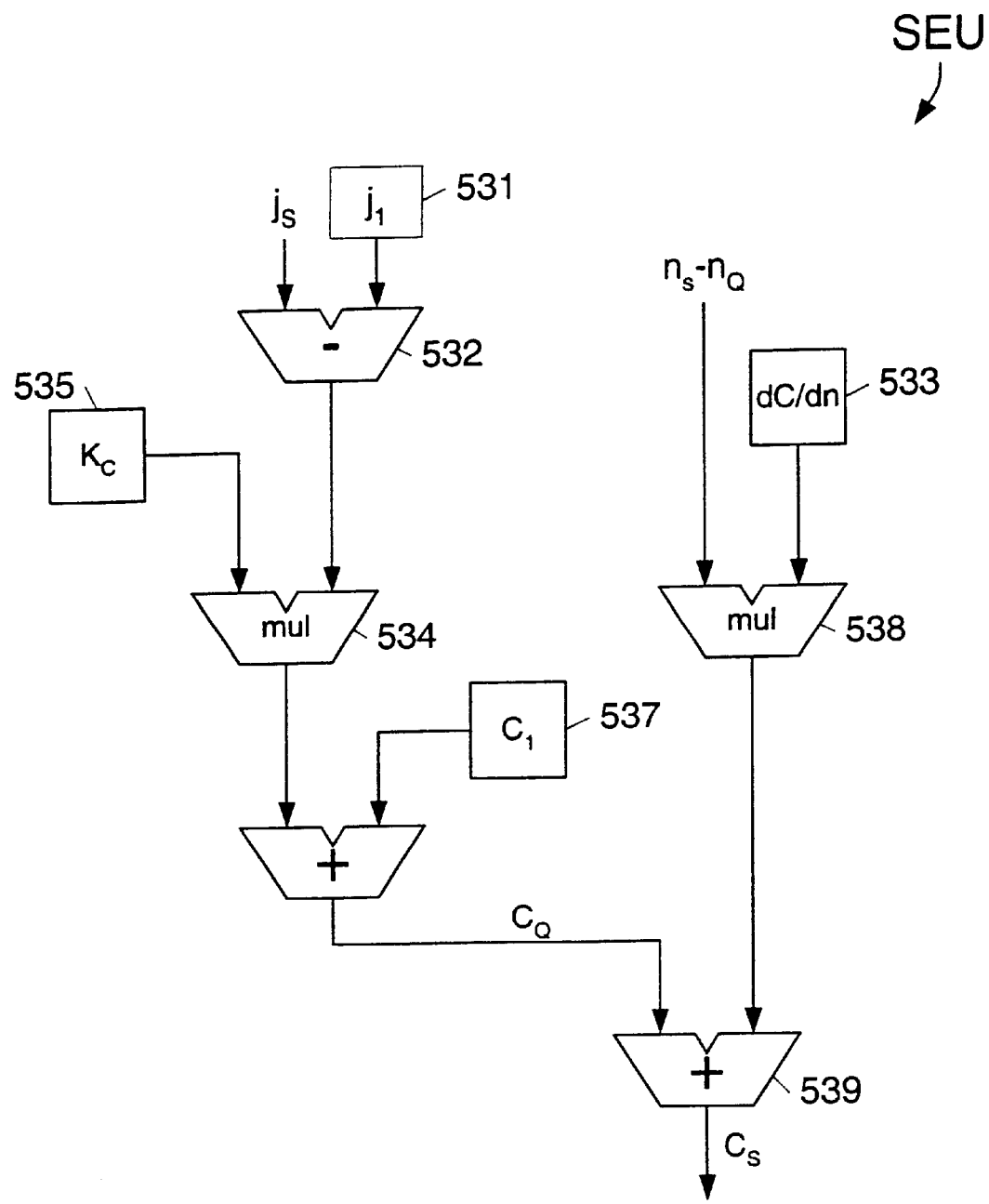
FIG. 15B illustrate one embodiment of a sample evaluation unit SEU for computing sample ordinate values $C_S$ based on a minor axis rate parameter, a controlling edge scaling parameter, an edge-relative sample displacement along the minor axis direction, and a major axis displacement between the sample and a root vertex of the controlling edge.

Rendering unit 150A may also comprise a sample evaluation unit SEU to compute ordinate values $C_S$ for each valid sample S in the candidate bins. FIG. 15B illustrates one embodiment of sample evaluation unit SEU. Sample evaluation unit SEU may be configured to receive and store ordinate value $C_1$ corresponding to vertex $V_1$, coordinate $j_1$ of vertex $V_1$, minor axis rate dC/dn and factor $K_C$. Sample evaluation SEU may receive the sample coordinate $j_S$ and corresponding precomputed minor axis difference value $(n_S-n_Q)$. Sample evaluation unit SEU may comprise a subtraction unit 532, multipliers 534 and 538, and adders 536 and 539. Subtraction unit 532 may receive sample coordinate $j_S$ and vertex coordinate $j_1$, and compute the difference $(j_S-j_1)$. Since major-axis coordinate $j_1$ does not vary from sample to sample, this value may be stored in a local register 531. Multiplier 534 may compute the product $K_C*(j_S-j_1)$. Adder 536 may compute the value $C_Q=C_1+(K_C*(j_S-j_1))$. Since ordinate value $C_1$ does not vary from sample to sample, it may be stored in another local register 537. Multiplier 538 may compute the product $(dC/dn)*(n_S-n_Q)$. Adder 539 may compute the sample ordinate value $C_S$ by adding $C_Q$ and the product generated by multiplier 538.

Sample evaluation unit SEU may include a rate register 533 and a factor register 535 for storing the values dC/dn and $K_C$ respectively. An ordinate setup unit OSU may compute the values dC/dn and $K_C$, and transmit these values to the rate register and factor register respectively.

In one embodiment, rendering unit 150A comprises one sample evaluation unit SEU which is used in a time-shared fashion to compute each ordinate value $C_S$ (e.g. red, green, blue, alpha, Z, etc.) for each valid sample S. For example, the sample evaluation unit SEU may compute ordinate values $R_S$, $G_S$, $B_S$, alpha$_S$, $z_S$ in five successive cycles, one ordinate value per cycle.

In a second embodiment, rendering unit 150A may comprise one sample evaluation unit per ordinate value, i.e. one for each of red, green, blue, alpha, Z, etc. In this case, the sample evaluation units may operate in parallel. For example, five sample evaluation units operating in parallel may generate respective ordinate values $R_S$, $G_S$, $B_S$, alpha$_S$, $z_S$ in one clock cycle.

In a third embodiment, an intermediate number of sample evaluation units may be employed. For example, two sample evaluation units may be used to compute five ordinate values (e.g. red, green, blue, alpha and Z) in three clock cycles as follows:

(a) red and green in parallel in a first clock cycle;

(b) blue and Z in parallel in a second clock cycle; and (c) alpha in a third clock cycle.

It is noted the assignment of ordinate values to clock cycles is arbitrary and may vary in other embodiments.

An array of multiplexors may receive values $x_1$, $x_2$, $x_3$, $x_S$, $y_1$, $y_2$, $y_3$, $y_S$, and output values $j_1$, $j_2$, $j_3$, $j_S$, $n_3$, $n_S$ according to the rules $j_1=x_1$, $j_2=x_2$, $j_3=x_3$, $j_S=n_S$, $n_3=y_3$ and $n_S=y_S$ when the triangle is X-major, and according to the rules $j_1=y_1$, $j_2=y_2$, $j_3=y_3$, $j_S=y_S$, $n_3=x_3$ and $n_S=x_S$ when the triangle is Y-major. The array of multiplexors may be controlled by the xMajor bit of the controlling edge. The outputs $j_1$, $j_2$, $j_3$, $j_S$, $n_3$, $n_S$ of the multiplexors may supply the one or more ordinate setup units and the one or more sample evaluation units.

In some embodiments, rendering unit 150A may organize the computation of sample ordinate value $C_S$ according to the relations $$dMajor = 1/(j_2 - j_1), \quad (24)$$
$$n_4 = m_{12}*j_3 + b_{12}, \quad (25)$$
$$dMinor = 1/(n_3 - n_4), \quad (26)$$
$$GammaMajor = (j_3 - j_1)*dMajor, \quad (27)$$
$$dMajorC = C_2 - C_1, \quad (28)$$
$$dMinorC = (C_3 - C_1) - (GammaMajor*dMajorC), \quad (29)$$
$$BetaMajor = (j_S - j_1)*dMajor, \quad (30)$$
$$BetaMinor = (n_S - n_Q)*dMinor, \quad (31)$$
$$C_S = C_1 + BetaMajor*dMajorC + BetaMinor*dMinorC. \quad (32)$$

It is noted that the value dMajor is one of the intermediate values generated in the computation of edge slopes described above. Thus, dMajor may be saved from the edge slope computations, and need not be recomputed for sample ordinate value computations. Also, the quantity $(n_S-n_Q)$ in equation (31) may be read from memory or an internal register, having been computed in sample inclusion testing step 220 of FIG. 13B.

Figure 16A:
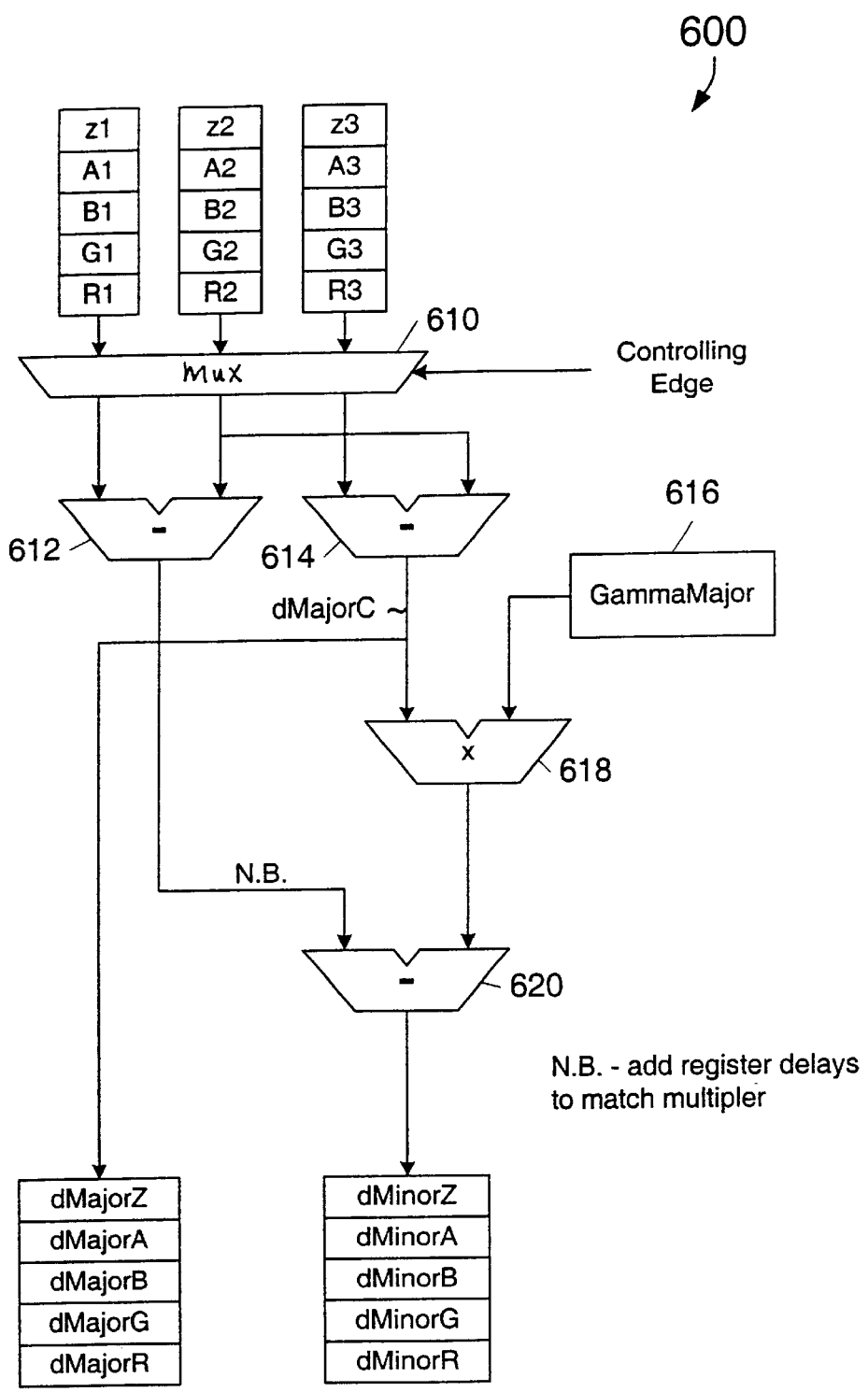
FIG. 16A illustrates one embodiment of a circuit 600 for computing intermediate values dMajorC and dMinorC for ordinate C equal to Z, Alpha, Blue, Green and Red.

FIG. 16A illustrates one embodiment of a circuit 600 for computing values dMajorC and dMinorC for C equal to Z, Alpha, Blue, Green and Red. A multiplexor 610 may permute the order of received ordinate data corresponding to vertices $V_1$, $V_2$ and $V_3$ in response to a controlling edge indication. For simplicity, assume hereafter that the edge E12 is the controlling edge. Subtraction unit 612 may compute the difference $C_3-C_1$, while subtraction unit 614 may compute the difference $C_2-C_1$. The difference $C_2-C_1$ may comprise the output dMajorC. Multiplication unit 618 may compute the product GammaMajor*dMajorC, and subtraction unit 620 may compute the result dMinorC=($C_3-C_1$)-(GammaMajor*dMajorC). Circuit 600 may sequentially generate output values for Z, alpha, blue, green and red.

Figure 16B:
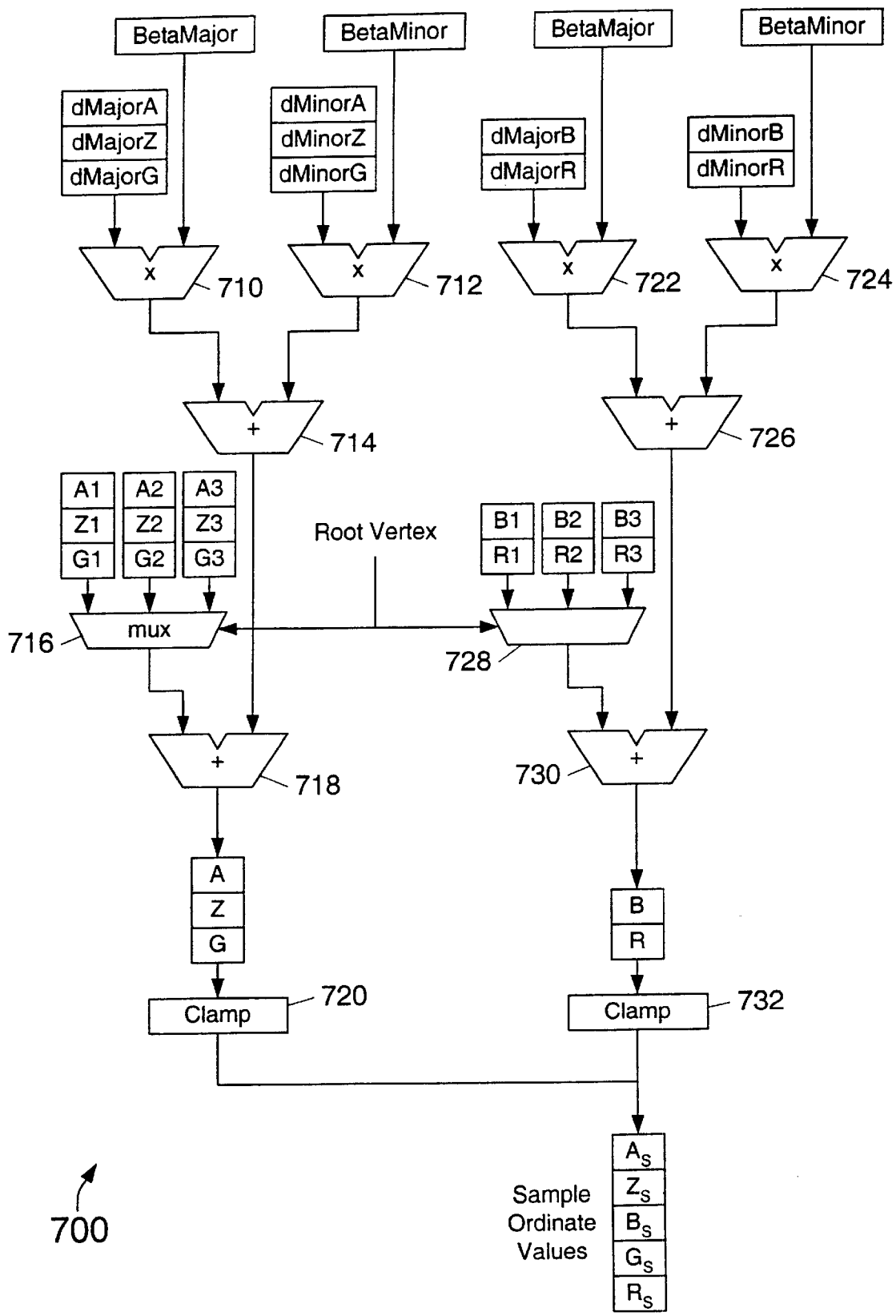
FIG. 16B illustrate one embodiment of a circuit 700 for computing sample ordinate value $C_S$ for C equal to any or all of green, Z, alpha, red and blue.

FIG. 16B illustrates one embodiment of a circuit 700 for computing sample ordinate value $C_S$ for C equal to any or all of green, Z, alpha, red and blue. Multiplier 710 may compute the product dMajorC*BetaMajor while multiplier 712 computes the product dMinorC*BetaMinor for C equal to green, Z and alpha successively. Adder 714 may compute the sum (dMajorC*BetaMajor)+(dMinorC*BetaMinor). Multiplexor 716 may select a root ordinate value $C_{root}$ corresponding to a root vertex based on a root vertex indication. The root vertex indication is determined at least in part by the controlling edge. Adder 718 add compute the sample ordinate value $C_S$ by adding the root ordinate value $C_{root}$ to the output value generated by adder 714, for C equal to green, Z and alpha. The sample ordinate values may be clamped in clamping unit 720.

Multiplier 722 may compute the product dMajorC*BetaMajor while multiplier 724 computes the product dMinorC*BetaMinor for C equal to blue and red. Adder 726 may compute the sum (dMajorC*BetaMajor)+(dMinorC*BetaMinor). Multiplexor 728 may select a root ordinate value corresponding to a root vertex based on a root vertex indication. The root vertex indication is determined at least in part by the controlling edge. Adder 730 computes the sample ordinate value $C_S$ by adding the root ordinate value to the output value generated by adder 726, for C equal to blue and red. The sample ordinate values may be clamped in clamping unit 732.

In one embodiment, circuit 700 may generate the sample ordinate values $R_S$, $G_S$, $B_S$, $Z_S$ and Alpha$_S$ in three cycles according to the schedule (a) red and green in a first clock cycle;
(b) blue and Z in a second clock cycle; and
(c) alpha in a third clock cycle.

In another set of embodiments, rendering unit 150A may be configured to compute sample ordinate value $C_S$ as follows. Rendering unit 150A may examine the sign bits of displacements $dj_{12}$, $dj_{23}$ and $dj_{31}$ to determine how the j coordinates $j_1$, $j_2$ and $j_3$ are ordered along the major axis j. Rendering unit may determine a one-to-one map T from the set $\{1,2,3\}$ to itself which corresponds to the j ordering, i.e. $j_{T(1)} \leq j_{T(2)} \leq j_{T(3)}$. Similarly, rendering unit 150A may examine the sign bits of displacements $dn_{12}$, $dn_{23}$ and $dn_{31}$ to determine how the n coordinates $n_1$, $n_2$ and $n_3$ are ordered along the minor axis n. Rendering unit 150A may determine a one-to-one map U from the set $\{1,2,3\}$ to itself which corresponds to the minor axis ordering, i.e. $n_{U(1)} \leq n_{U(2)} \leq n_{U(3)}$. By using maps T and U, rendering unit 150A may minimize the movement of the vertex data in memory.

Rendering unit 150A may compute the sample ordinate value $C_S$ according to the relations $$dnn = (n_{T(2)} - n_{T(1)}) - (n_{T(3)} - n_{T(1)})*(j_{T(2)} - j_{T(1)})*1/(j_{T(3)} - j_{T(1)}), \quad (33)$$
$$Dnn = 1/dnn, \quad (34)$$
$$djj = (j_{U(2)} - j_{U(1)}) - (j_{U(3)} - j_{U(1)})*(n_{U(2)} - n_{U(1)})*1/(n_{U(3)} - n_{U(1)}), \quad (35)$$
$$Djj = 1/djj, \quad (36)$$
$$dC/dn = ((C_{T(2)} - C_{T(1)}) - (C_{T(3)} - C_{T(1)})*(j_{T(2)} - j_{T(1)})*1/(j_{T(3)} - j_{T(1)}))*Dnn, \quad (37)$$
$$dC/dj = ((C_{u(2)} - C_{U(1)}) - (C_{U(3)} - C_{U(1)})*(n_{U(2)} - n_{U(1)})*(1/(n_{U(3)} - n_{U(1)}))*Djj, \quad (38)$$
$$C_S = C_1 + (dn_{1S})*dC/dn + (dj_{1S})*dC/dj, \quad (39)$$

where dC/dn is the minor axis rate of change of ordinate C, dC/dj is the major rate of change of ordinate C, $dn_{1S}=n_S-n_{T(1)}$ is the minor axis displacement between the sample point S and the vertex with minimum major axis coordinate, $dj_{1S}=j_S-j_{T(1)}$ is the major axis displacement between the sample point S and the vertex with minimum major axis coordinate. It is noted that the quantities $(n_{T(2)}-n_{T(1)})$, $(n_{T(3)}-n_{T(1)})$, $(j_{T(2)}-j_{T(1)})$, $(j_{T(3)}-j_{T(1)})$, $(j_{T(3)}-j_{T(1)})$, $(j_{U(2)}-j_{U(1)})$, $(j_{U(3)}-j_{U(1)})$, $(n_{U(2)}-n_{U(1)})$, $(n_{U(3)}-n_{U(1)})$ used in relations (33), (35), (37) and (38) are already available, having been determined up to sign change by the previous computation of x and y displacements $dx_{12}$, $dy_{12}$, $dx_{23}$, $dy_{23}$, $dx_{31}$ and $dy_{31}$. Thus, these quantities need not be recomputed.

Figure 17:
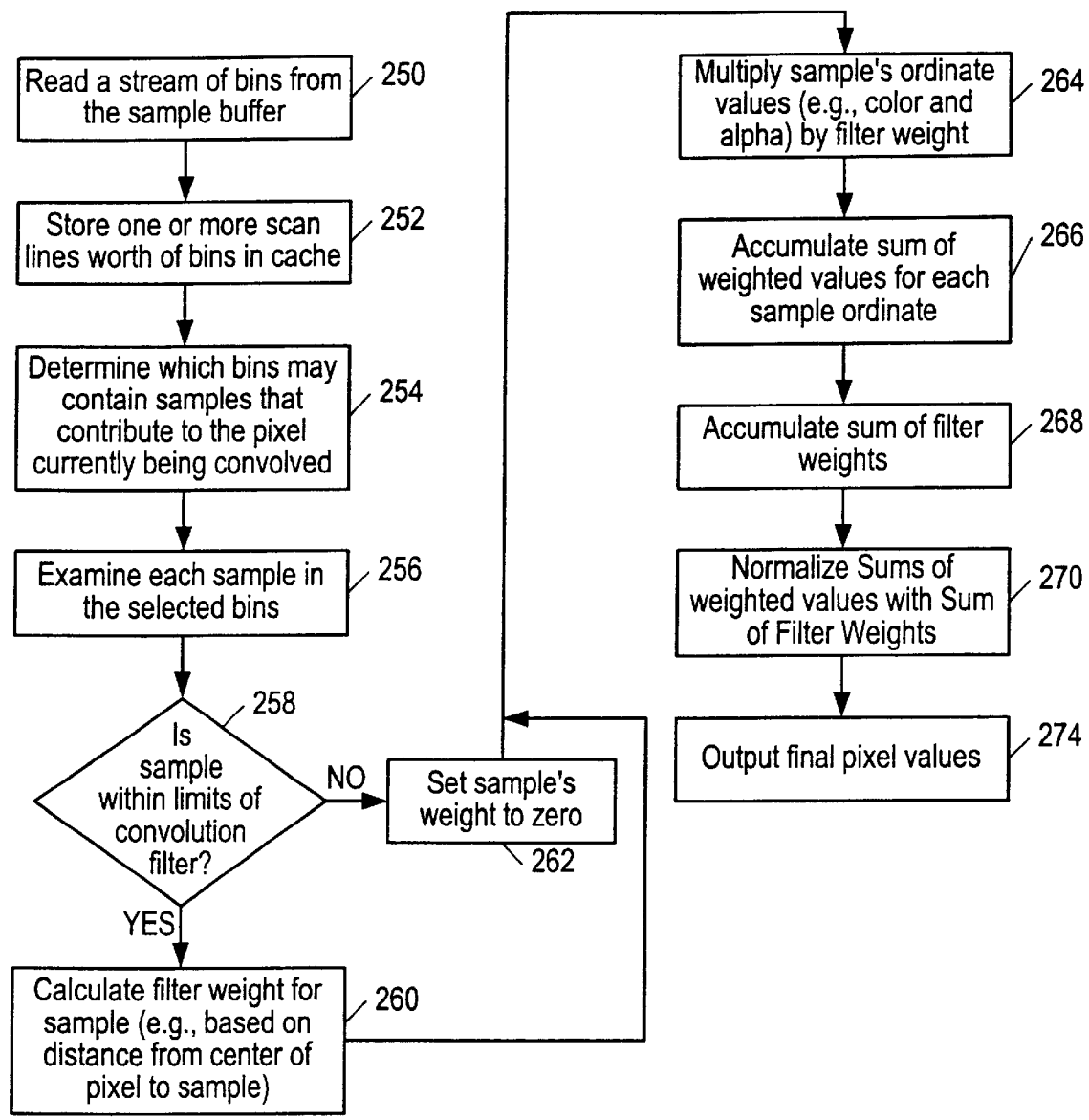
FIG. 17 illustrates one embodiment of a method for calculating pixel values from sample values.

FIG. 17—Generating Output Pixels Values From Sample Values

FIG. 17 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow the sample-to-pixel calculation units 170 easy access to samples (i.e. samples positions and their corresponding ordinate values) during the convolution operation. In step 254, the memory bins are examined to determine which of the memory bins may contain samples that contribute to the output pixel value currently being generated. The support (i.e. footprint) of the filter kernel 400 (see FIG. 12A) intersects a collection of spatial bins. The memory bins corresponding to these samples may contain sample values that contribute to the current output pixel.

Each sample in the selected bins (i.e. bins that have been identified in step 254) is then individually examined to determine if the sample does indeed contribute samples to the support of filter kernel 400 (as indicated in steps 256–258). This determination may be based upon the distance from the sample to the center of the output pixel being generated.

In one embodiment, the sample-to-pixel calculation units 170 may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. In one embodiment, this squared-distance indexing scheme may be facilitated by using a floating point format for the distance (e.g., four or five bits of mantissa and three bits of exponent), thereby allowing much of the accuracy to be maintained while compensating for the increased range in values. The table of filter weights may be stored in ROM and/or RAM. Filter tables implemented in RAM may, in some embodiments, allow the graphics system to vary the filter coefficients on a per-frame or per-session basis. For example, the filter coefficients may be varied to compensate for known shortcomings of a display and/or projection device or for the user's personal preferences. The graphics system can also vary the filter coefficients on a screen area basis within a frame, or on a per-output pixel basis. In another alternative embodiment, graphics board GB may include specialized hardware (e.g., multipliers and adders) to calculate the desired filter weights for each sample. The filter weight for samples outside the limits of the convolution filter may simply be multiplied by a filter weight of zero (step 262), or they may be removed from the convolution-sum calculation entirely.

In one alternative embodiment, the filter kernel may not be expressible as a function of distance with respect to the filter center. For example, a pyramidal tent filter is not expressible as a function of distance from the filter center. Thus, filter weights may be tabulated (or computed) in terms of X and Y sample-displacements with respect to the filter center.

Once the filter weight for a sample has been determined, the ordinate values (e.g. red, green, blue, alpha, etc.) for the sample may then be multiplied by the filter weight (as indicated in step 264). Each of the weighted ordinate values may then be added to a corresponding cumulative sum—one cumulative sum for each ordinate—as indicated in step 266. The filter weight itself may be added to a cumulative sum of filter weights (as indicated in step 268). After all samples residing in the support of the filter have been processed, the cumulative sums of the weighted ordinate values may be divided by the cumulative sum of filter weights (as indicated in step 270). It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, the normalized output pixels may be output for gamma correction, digital-to-analog conversion (if necessary), and eventual display (step 274).

Figure 18:
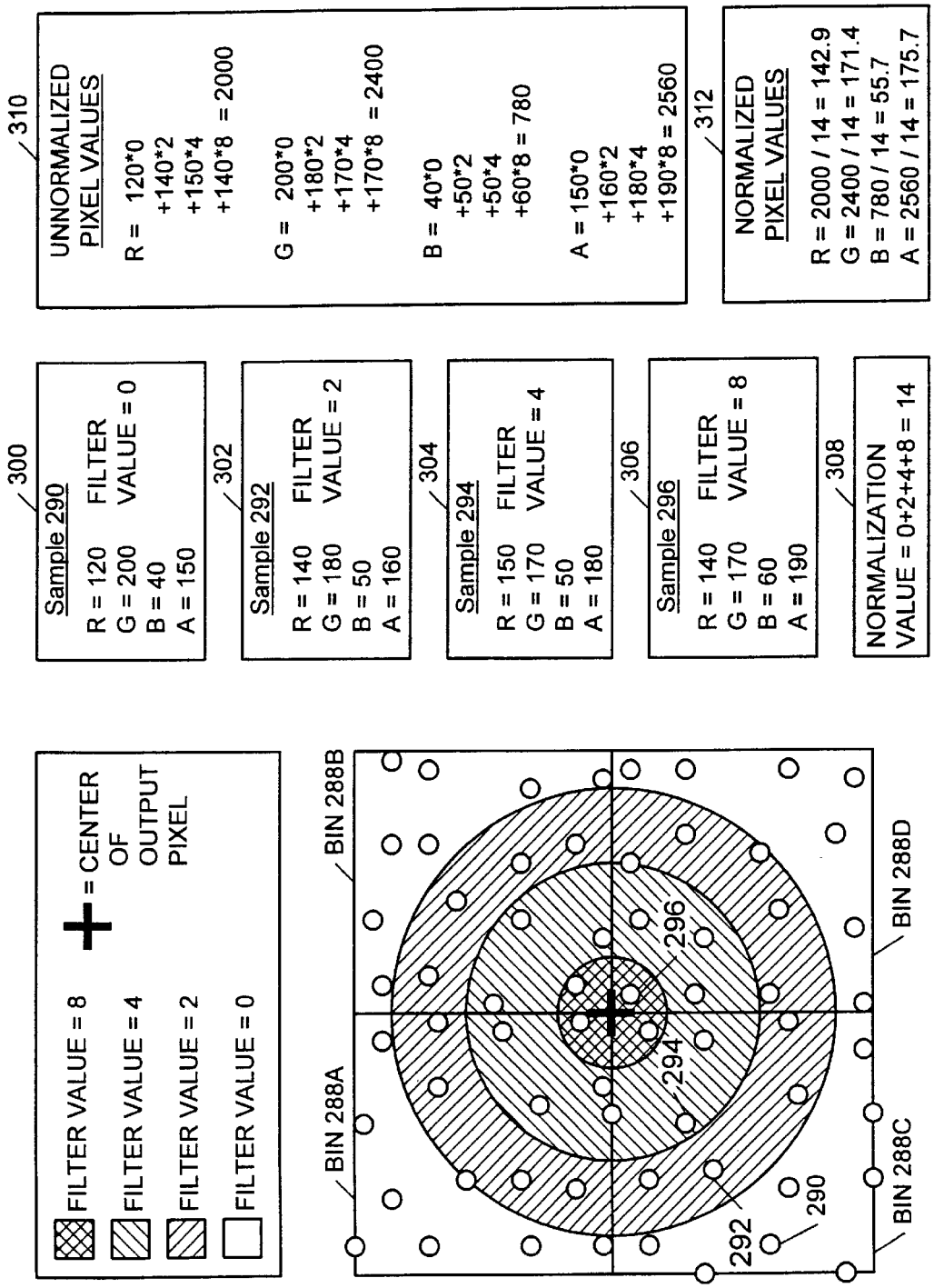
FIG. 18 illustrates details of one embodiment of a convolution for an example set of samples at a virtual pixel center in the 2-D viewport.

FIG. 18—Example Output Pixel Convolution

FIG. 18 illustrates a simplified example of an output pixel convolution with a filter kernel which is radially symmetric and piecewise constant. As the figure shows, four bins 288A–D contain samples that may possibly contribute to the output pixel convolution. In this example, the center of the output pixel is located at the shared corner of bins 288A–288D. Each bin comprises sixteen samples, and an array of four bins (2×2) is filtered to generate the ordinate values (e.g. red, green, blue, alpha, etc.) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed ordinate values for the output pixel. Because the filter kernel is a decreasing function of distance from the pixel center, samples close to the pixel center may contribute more to the computed ordinate values than samples farther from the pixel center. This type of filtering may be used to perform image smoothing or anti-aliasing.

Example ordinate values for samples 290–296 are illustrated in boxes 300–306. In this example, each sample comprises red, green, blue and alpha values, in addition to the sample's positional data. Block 310 illustrates the calculation of each pixel ordinate value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel ordinate values.

The filter presented in FIG. 18 has been chosen for descriptive purposes only and is not meant to be limiting. A wide variety of filters may be used for pixel value computations depending upon the desired filtering effect(s). It is a well known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Rom filter as a special case) are obtained by approximating some of the negative lobes and positive lobes which surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

The piecewise constant filter function shown in FIG. 18 with four constant regions is not meant to be limiting. For example, in one embodiment the convolution filter may have a large number of regions each with an assigned filter value (which may be positive, negative and/or zero). In another embodiment, the convolution filter may be a continuous function that is evaluated for each sample based on the sample's distance (or X and Y displacements) from the pixel center. Also note that floating point values may be used for increased precision.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A rendering unit comprising:
   sample position generation logic configured to generate sample positions in a two-dimensional screen space;
   sample testing logic configured to receive graphics data including three vertices defining a triangle and to determine which of said sample positions reside inside the triangle;
   sample ordinate generation logic coupled to the sample position generation logic and the sample testing logic, wherein the sample ordinate generation logic is configured to compute a first axial rate of change of a first ordinate based on the three vertices, and, for each sample position residing inside the triangle, (a) to multiply the first axial rate by a first sample displacement resulting in a first product, (b) to interpolate a first projection value for a projection point on a first edge of the triangle, and (c) to add the first product to the first projection value resulting in a first sample ordinate value, wherein the first sample ordinate value is usable to determine at least a portion of a displayable image.

2. The rendering unit of claim 1, wherein the sample testing logic is further configured to compute a horizontal edge displacement and a vertical edge displacement for each of the triangle edges, to determine a major displacement as the maximum of the horizontal edge displacement and a vertical edge displacement for each edge, to determine the first edge as the edge whose major displacement is greater than or equal to the major displacements for all other edges of the triangle.

3. The rendering unit of claim 1, wherein the sample ordinate generation logic is further configured to compute the first axial rate by: determining a change in the first ordinate between an opposing vertex not on the first edge and an auxiliary point on the first edge having an identical first axis coordinate as the opposing vertex, determining a coordinate change along the first axis between the opposing vertex and the auxiliary point, and multiplying the first ordinate change by the reciprocal of the first axis coordinate change.

4. The rendering unit of claim 3, wherein the sample ordinate generation logic is configured to determine the first ordinate change by interpolating an auxiliary ordinate value for the auxiliary point based on a first vertex and a second vertex terminating the first edge and, subtracting the auxiliary ordinate value from an opposing ordinate value of the opposing vertex.

5. The rendering unit of claim 1, wherein the sample ordinate generation logic is configured to interpolate the first projection value for the projection point by computing a first difference between a first coordinate of the projection point and a first coordinate of a first vertex of the first edge, multiplying the first difference by a first scaling factor resulting in a second difference, and adding the second difference to a root ordinate value corresponding to the first vertex.

6. The rendering unit of claim 5, wherein the sample ordinate generation logic is configured to compute the first scaling factor by determining an ordinate change between a second vertex of the first edge and the first vertex, determining a second difference between a first coordinate of the second vertex and the first coordinate of the first vertex, and multiplying the ordinate change by the reciprocal of the second difference.

7. The rendering unit of claim 1, wherein the sample testing logic is configured to determine if each sample position resides inside the triangle by computing edge-relative displacements between the sample position and the three edges of the triangle, wherein the first sample displacement comprises the edge-relative displacement for the first edge.

8. The rendering unit of claim 1, wherein the first ordinate is selected from the group consisting of red, green, blue, transparency, texture, depth, magenta, cyan, yellow, grayscale.

9. The rendering unit of claim 1, wherein the sample position logic is configured to generate the sample positions according to a perturbed regular sample-positioning scheme or a stochastic sample positioning scheme.

10. The rendering unit of claim 1, wherein the sample ordinate generation logic comprises dedicated hardware to compute the first axial rate, and to perform (a), (b), (c) for each sample position inside the triangle.

11. The rendering unit of claim 1 further comprising:
    a sample buffer configured to store the first sample ordinate value for each of the sample positions inside the triangle; and
    a sample-to-pixel calculation unit configured to read one or more of the first sample ordinate values from the sample buffer, to generate a pixel value by filtering the one or more first sample ordinate values, and to supply the pixel value to a display device.

12. A graphics system comprising:
    an input configured to receive graphics data including three vertices defining a triangle; and
    a rendering unit coupled to the input and configured to receive the graphics data including the three vertices defining the triangle from the input unit, wherein the rendering unit is further configured to generate samples in a two-dimensional screen space, wherein the rendering unit is configured to determine which of said samples reside inside the triangle;
    wherein said rendering unit is configured to compute a first axial rate of change of a first ordinate based on the three vertices, and, for each sample residing inside the triangle, (a) to multiply the first axial rate by a first sample displacement resulting in a first product, (b) to interpolate a first projection value for a projection point on a first edge of the triangle, and (c) to add the first product to the first projection value resulting in a first sample ordinate value, wherein the first sample ordinate value is usable to determine at least a portion of a displayable image.

13. A method for computing sample ordinate values in a graphics system, the method comprising:
    receiving graphics data including three vertices defining a triangle;
    receiving sample positions which reside in a two-dimensional screen space;

computing a first axial rate of change of a first ordinate based on the three vertices, and, for each of said sample positions residing inside the triangle:
(a) multiplying the first axial rate by a first sample displacement resulting in a first product;
(b) interpolating a first projection value for a projection point on a first edge of the triangle; and
(c) adding the first product to the first projection value resulting in a first sample ordinate value, wherein said first sample ordinate value is usable to determine at least a portion of a displayable image.

14. The method of claim 13 further comprising:
computing a horizontal edge displacement and a vertical edge displacement for each of the triangle edges;
determining a major displacement as the maximum of the horizontal edge displacement and a vertical edge displacement for each edge;
determining the first edge as the edge whose major displacement is greater than or equal to the major displacements for all other edges of the triangle.

15. The method of claim 13, wherein said computing the first axial rate comprises:
determining a change in the first ordinate between an opposing vertex not on the first edge and an auxiliary point on the first edge having an identical first axis coordinate as the opposing vertex;
determining a coordinate change along the first axis between the opposing vertex and the auxiliary point; and
multiplying the first ordinate change by the reciprocal of the first axis coordinate change.

16. The method of claim 15, wherein said determining the first ordinate change comprises:
interpolating an auxiliary ordinate value for the auxiliary point based on a first vertex and a second vertex terminating the first edge; and
subtracting the auxiliary ordinate value from an opposing ordinate value of the opposing vertex.

17. The method of claim 13, wherein said interpolating the first projection value for the projection point comprises:
computing a first difference between a first coordinate of the projection point and a first coordinate of a first vertex of the first edge;
multiplying the first difference by a first scaling factor resulting in a second difference; and
adding the second difference to a root ordinate value corresponding to the first vertex.

18. The method of claim 17, wherein said computing the first scaling factor comprises:
determining an ordinate change between a second vertex of the first edge and the first vertex;
determining a second difference between a first coordinate of the second vertex and the first coordinate of the first vertex; and
multiplying the ordinate change by the reciprocal of the second difference.

19. The method of claim 13 further comprising determining if each of said sample positions reside inside the triangle by computing edge-relative displacements between the sample positions and the three edges of the triangle, wherein the first sample displacement comprises the edge-relative displacement for the first edge.

20. The method of claim 13, wherein the first ordinate is selected from the group consisting of red, green, blue, transparency, texture, depth, magenta, cyan, yellow, grayscale.

21. The method of claim 13 further comprising:
operating on the first sample ordinate values corresponding to one or more sample positions to generate a pixel value; and
transmitting the pixel value to a display device.

22. A method comprising:
receiving graphics data including three vertices defining a triangle;
receiving samples which reside in a two-dimensional screen space;
computing a first minor axis ordinate difference along a minor axis of the triangle; and
computing a first sample ordinate value for each sample inside the triangle, wherein said computing the first sample ordinate value for a first sample inside the triangle includes:
(a) computing a minor axis positional fraction corresponding to the first sample;
(b) multiplying the minor axis positional fraction by the first minor axis ordinate difference to generate a first product; and
(c) adding the first product to one or more ordinate adjustment values to generate the first sample ordinate value, wherein the first sample ordinate value is usable to determine at least a portion of a pixel in a displayable image.

23. The method of claim 22, wherein said computing the first minor axis ordinate difference comprises:
interpolating an auxiliary ordinate value for an auxiliary point on a first edge of the triangle;
subtracting the auxiliary ordinate value from an ordinate value of an opposing vertex not on the first edge;
wherein the auxiliary point has the same major axis coordinate as the opposing vertex.

24. The method of claim 23, wherein said computing the minor axis positional fraction corresponding to the first sample comprises:
subtracting a minor axis coordinate of the auxiliary point from the minor axis coordinate of the opposing vertex to generate a minor axis positional difference;
multiplying a first minor axis sample displacement corresponding to the first sample by a reciprocal of the minor axis positional difference to generate said minor axis positional fraction.

25. The method of claim 24, wherein said first minor axis sample displacement is equal to a minor axis coordinate of said first sample minus a minor axis coordinate of a projection point on the first edge, wherein the projection point has the same major axis coordinate as the first sample.

26. The method of claim 22 further comprising computing a first edge ordinate difference for a first edge of the triangle, wherein said computing the first sample ordinate value for the first sample inside the triangle further includes:
(d) computing a major axis positional fraction corresponding to the first sample;
(e) multiplying the major axis positional fraction by the first edge ordinate difference to generate a first one of said one or more ordinate adjustment values, wherein an ordinate value of a first vertex bounding the first edge is a second one of said one or more ordinate adjustment values.

27. The method of claim 26, wherein said computing the first edge ordinate difference comprises subtracting an ordinate value for the first vertex from an ordinate value of a second vertex bounding the controlling edge.

28. The method of claim 26, wherein said computing the major axis positional fraction corresponding to the first sample comprises:

subtracting a major axis coordinate of the first vertex from a major axis coordinate of a second vertex bounding the first edge to generate a first edge major displacement;

subtracting a major axis coordinate of the first vertex from a major axis coordinate of the first sample to generate a sample-relative major axis displacement;

multiplying the sample-relative major axis displacement by the reciprocal of the controlling edge major displacement.

29. The method of claim 26 further comprising:

computing a horizontal edge displacement and a vertical edge displacement for each of the triangle edges;

determining a major displacement for each edge as the maximum of the horizontal edge displacement and a vertical edge displacement;

determining the first edge as the edge whose major displacement is greater than or equal to the major displacements for all other edges of the triangle.

30. The method of claim 22 further comprising:

operating on the first sample ordinate values corresponding to one or more samples to generate a pixel value; and transmitting the pixel value to a display device.

31. A graphics system comprising:

sample position generation logic configured to generate sample positions in a two-dimensional screen space;

sample ordinate generation logic configured to receive graphics data including three vertices defining a triangle and ordinate data for each of the three vertices, and to compute a first minor axis ordinate difference along a minor axis of the triangle, wherein the rendering unit is further configured to compute a first sample ordinate value for a first sample position inside the triangle by:

(a) computing a minor axis positional fraction corresponding to the first sample position;

(b) multiplying the minor axis positional fraction by the first minor axis ordinate difference to generate a first product;

(c) adding the first product to one or more ordinate adjustment values to generate the first sample ordinate value, wherein the first sample ordinate value is usable to determine at least a portion of a pixel in a displayable image.

32. The graphics system of claim 31, wherein said sample ordinate generation logic is configured to compute the first minor axis ordinate difference by:

interpolating an auxiliary ordinate value for an auxiliary point on a first edge of the triangle;

subtracting the auxiliary ordinate value from an ordinate value of an opposing vertex not on the first edge;

wherein the auxiliary point has the same major axis coordinate as the opposing vertex.

33. The graphics system of claim 32, wherein said sample ordinate generation logic is configured to compute the minor axis positional fraction corresponding to the first sample by:

subtracting a minor axis coordinate of the auxiliary point from the minor axis coordinate of the opposing vertex to generate a minor axis positional difference;

multiplying a first minor axis sample displacement corresponding to the first sample position by a reciprocal of the minor axis positional difference to generate said minor axis positional fraction.

34. The graphics system of claim 33, wherein said first minor axis sample displacement is equal to a minor axis coordinate of said first sample position minus a minor axis coordinate of a projection point on the first edge, wherein the projection point has the same major axis coordinate as the first sample position.

35. The graphics system of claim 31, wherein said sample ordinate generation logic is further configured to compute a first edge ordinate difference for a first edge of the triangle, and to compute the first sample ordinate value for the first sample position inside the triangle by:

(d) computing a major axis positional fraction corresponding to the first sample;

(e) multiplying the major axis positional fraction by the first edge ordinate difference to generate a first one of said one or more ordinate adjustment values, wherein an ordinate value of a first vertex bounding the first edge is a second one of said one or more ordinate adjustment values.

36. The graphics system of claim 35, wherein said sample ordinate generation logic is configured to compute the first edge ordinate difference by subtracting an ordinate value for the first vertex from an ordinate value of a second vertex bounding the controlling edge.

37. The graphics system of claim 35, wherein said sample ordinate generation logic is configured to compute the major axis positional fraction corresponding to the first sample by:

multiplying a sample-relative major axis displacement by the reciprocal of a controlling edge major displacement, wherein the first edge major displacement is a difference between a major axis coordinate of the first vertex and a major axis coordinate of a second vertex bounding the first edge, wherein the sample-relative major axis displacement is a difference between a major axis coordinate of the first vertex and a major axis coordinate of the first sample.

38. The graphics system of claim 35 further comprising sample testing logic configured to:

compute a horizontal edge displacement and a vertical edge displacement for each of the triangle edges;

determine a major displacement for each edge as the maximum of the horizontal edge displacement and a vertical edge displacement; and determine the first edge as the edge whose major displacement is greater than or equal to the major displacements for all other edges of the triangle.

39. The graphics system of claim 31 further comprising a sample-to-pixel calculation unit configured to operate on the first sample ordinate values corresponding to one or more of the sample positions to generate a pixel value, and to transmit the pixel value to a display device.

40. A rendering unit comprising:

position generation logic configured to generate pixel positions in a two-dimensional screen space;

testing logic configured to receive graphics data including three vertices defining a triangle and to determine which of said pixel positions reside inside the triangle;

ordinate generation logic coupled to the position generation logic and the testing logic, wherein the ordinate generation logic is configured to compute a first axial rate of change of a first ordinate based on the three vertices, and, for each pixel position residing inside the triangle, (a) to multiply the first axial rate by a first pixel displacement resulting in a first product, (b) to interpolate a first projection value for a projection point on a first edge of the triangle, and (c) to add the first product to the first projection value resulting in a first pixel ordinate value, wherein the first pixel ordinate value is usable to determine at least a portion of a displayable image.

41. A method for computing pixel ordinate values in a graphics system, the method comprising:

receiving graphics data including three vertices defining a triangle;

receiving pixel positions which reside in a two-dimensional screen space;

computing a first axial rate of change of a first ordinate based on the three vertices, and, for each of said pixel positions residing inside the triangle:

(a) multiplying the first axial rate by a first pixel displacement resulting in a first product;

(b) interpolating a first projection value for a projection point on a first edge of the triangle; and (c) adding the first product to the first projection value resulting in a first pixel ordinate value, wherein said first pixel ordinate value is usable to determine at least a portion of a displayable image.

* * * * *